United States Patent
Chen et al.

(10) Patent No.: US 11,467,254 B2
(45) Date of Patent: Oct. 11, 2022

(54) METHOD AND APPARATUS OF RADAR-BASED ACTIVITY DETECTION

(71) Applicant: Samsung Electronics Co., Ltd., Suwon-si (KR)

(72) Inventors: Guanbo Chen, Allen, TX (US); Wenxun Qiu, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/184,450

(22) Filed: Feb. 24, 2021

(65) Prior Publication Data

US 2021/0270936 A1   Sep. 2, 2021

Related U.S. Application Data

(60) Provisional application No. 62/982,496, filed on Feb. 27, 2020.

(51) Int. Cl.
  *G01S 7/41*   (2006.01)
  *G06F 3/01*   (2006.01)

(52) U.S. Cl.
  CPC ............. *G01S 7/415* (2013.01); *G01S 7/418* (2013.01); *G06F 3/017* (2013.01)

(58) Field of Classification Search
  CPC ........ G01S 7/415; G01S 7/418; G01S 13/582; G01S 13/584; G06F 3/017; G06F 3/011
  See application file for complete search history.

(56) References Cited

U.S. PATENT DOCUMENTS

| | | | |
|---|---|---|---|
| 8,385,676 B2* | 2/2013 | Weinberger | G06V 10/30 348/250 |
| 9,335,825 B2* | 5/2016 | Rautiainen | G01S 13/88 |
| 9,833,196 B2 | 12/2017 | Sarrafzadeh et al. | |
| 10,186,030 B2 | 1/2019 | Park | |
| 10,509,479 B2* | 12/2019 | Molchanov | G06N 3/084 |
| 10,788,880 B2* | 9/2020 | Giusti | G01S 7/35 |
| 10,890,653 B2* | 1/2021 | Giusti | G06F 3/017 |
| 10,977,524 B2* | 4/2021 | Samala | G06K 9/6262 |
| 2014/0033141 A1* | 1/2014 | Samuels | G06F 3/04883 715/863 |

(Continued)

FOREIGN PATENT DOCUMENTS

| CN | 110262653 A | 9/2019 |
|---|---|---|
| CN | 111475030 A | 7/2020 |

*Primary Examiner* — Grant Sitta

(57) ABSTRACT

A method includes receiving from a transceiver, at a processor of an electronic device, a radar signal, the radar signal including a set of signal strength values across a range of Doppler frequency shift values and a range of time values. The method further includes extracting a time series of frequency features from the radar signal, wherein frequency features of the time series of frequency features include a determined Doppler frequency shift value for each time value of the range of time values, identifying segments within the time series of frequency features, analyzing the segments to determine a start time for a classification engine, at the start time, analyzing, by the classification engine, at least one of a subset of the time series of frequency features or a subset of the radar signal to identify a control gesture, and triggering a control input associated with the control gesture.

18 Claims, 13 Drawing Sheets

(56) References Cited

U.S. PATENT DOCUMENTS

| | | | |
|---|---|---|---|
| 2017/0206405 A1* | 7/2017 | Molchanov | G06K 9/627 |
| 2018/0211104 A1* | 7/2018 | Zhao | G06K 9/00355 |
| 2019/0087009 A1* | 3/2019 | Rao | G01S 7/415 |
| 2019/0162821 A1* | 5/2019 | Rafrafi | G01S 7/352 |
| 2019/0244016 A1* | 8/2019 | Tai | G01S 7/414 |
| 2020/0167553 A1* | 5/2020 | Abghari | G06V 40/20 |
| 2020/0209378 A1* | 7/2020 | Yokev | H04W 72/1215 |
| 2020/0241672 A1* | 7/2020 | Kushnir | G01S 13/88 |
| 2020/0289373 A1* | 9/2020 | Vleugels | G06F 3/017 |
| 2020/0293116 A1* | 9/2020 | Udall | G06F 3/017 |
| 2020/0319302 A1* | 10/2020 | Nanzer | G01S 13/4454 |
| 2020/0319324 A1 | 10/2020 | Au et al. | |
| 2021/0183489 A1* | 6/2021 | Monirabbasi | G06F 1/1694 |
| 2021/0326642 A1* | 10/2021 | Gillian | G01S 13/66 |
| 2022/0003862 A1* | 1/2022 | Fei | G06F 3/017 |

* cited by examiner

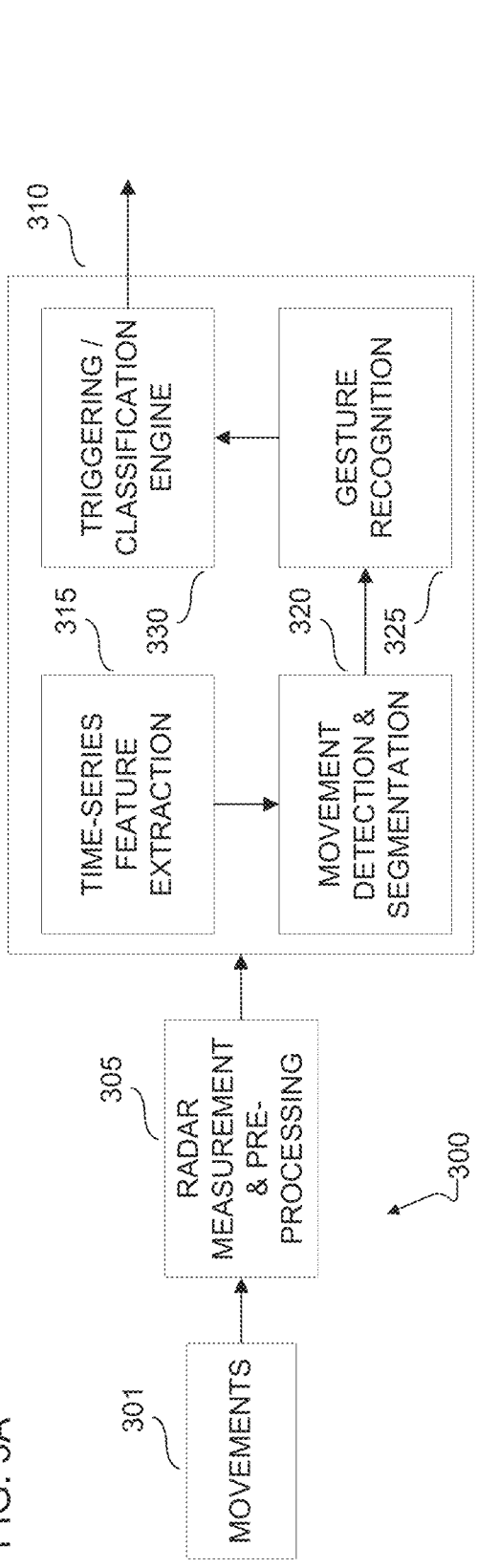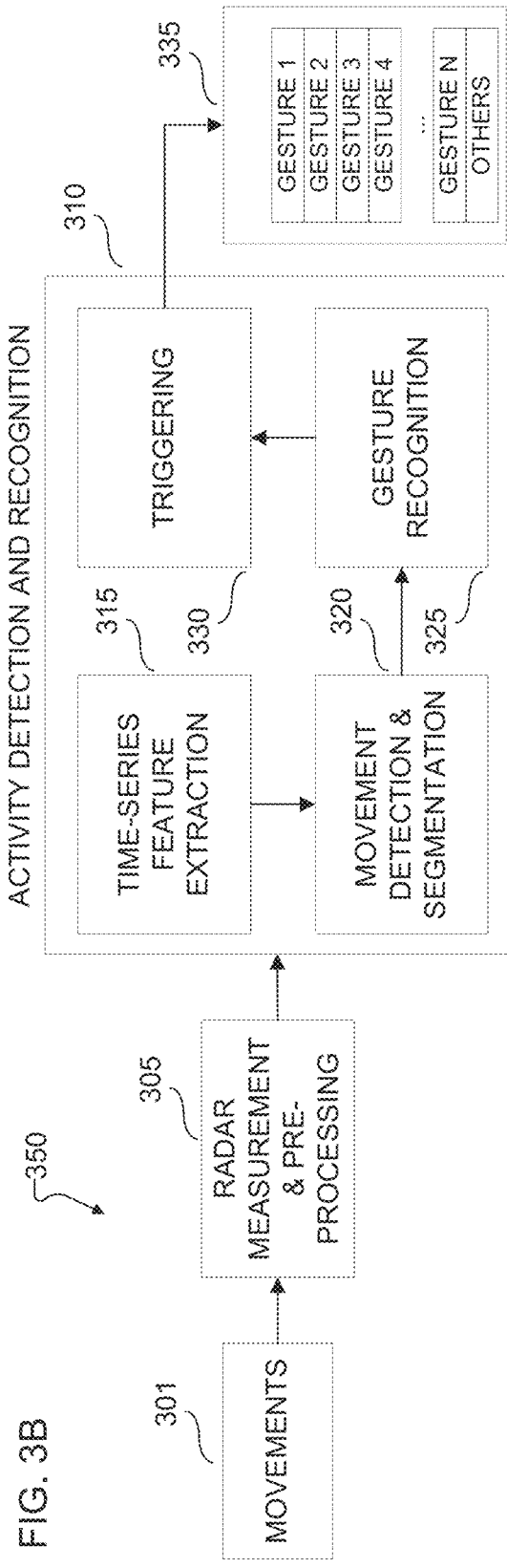

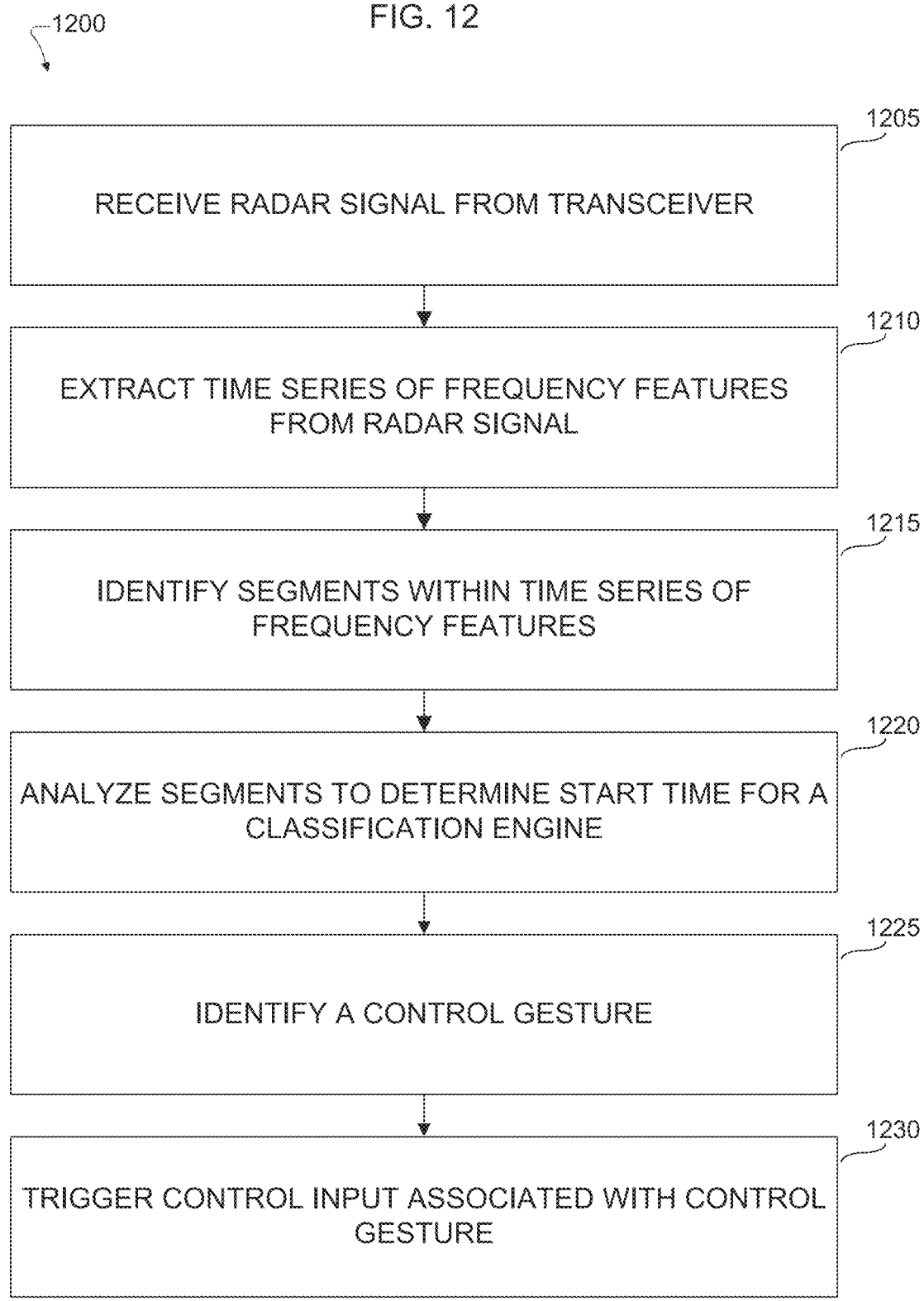

METHOD AND APPARATUS OF RADAR-BASED ACTIVITY DETECTION

CROSS-REFERENCE TO RELATED APPLICATION AND CLAIM OF PRIORITY

This application claims priority under 35 U. S.C. § 119(e) to U.S. Provisional Patent Application No. 62/982,496 filed Feb. 27, 2020. The above-identified provisional application is hereby incorporated by reference in its entirety.

TECHNICAL FIELD

This disclosure relates generally to computing and providing additional modes for touchless user control of computing platforms. More specifically, this disclosure relates to a method and apparatus of radar-based activity detection.

BACKGROUND

Advances in the underlying hardware, such as the inclusion of radar sensors in the radio hardware, and the incorporation of neural processing units ("NPUs") in certain computing platforms such as smartphones and tablets have expanded the possibilities for ways in which users can interact with and provide control inputs to such devices beyond touch inputs on a screen and spoken inputs through a microphone. The built-in radar functionality of such devices can generate a signal based on the movements of objects within a near field of the electronic device can be recognized. With sufficient processing, user gestures, such as waving of a hand in a given direction relative to the electronic device, can be recognized within the radar signal and used as inputs to trigger functionalities of applications provided by the electronic device. For example, a user could, as an alternative to pressing a button region of a touchscreen to increase a media playback volume, instead move their hand in a predetermined gesture near the device.

However, significant technical challenges and opportunities for improvements in the art remain in terms of developing radar-based gesture detection to being an effective alternative to touch-based and verbal inputs as a source of control inputs for certain computing platforms. Specifically, in contrast to touch or verbal inputs, where, from the sensor's point of view, the start and endpoints of the control input are readily apparent, in that the signal of interest at a microphone or capacitive touch sensor sharply drops off when the input ends (i.e., the user stops speaking, or lifts their finger from the screen), the start and endpoints of a gesture are not as self-defined in the raw radar signal, in which the signal(s) associated with the control are bounded by irrelevant signals before and after the gesture is performed. Additionally, in contrast to voice signals, which typically vary across a single dimension (for example, amplitude) over time, or touch signals, which typically vary across two dimensions (for example, x and y coordinates on a touchscreen) over time, radar signals vary across at least three dimensions (x, y, and z) over time.

In practical terms, the added challenges associated with recognizing gestures in radar signals have, for a given set of processing resources, historically imposed a zero-sum tradeoff between latency and accuracy. That is, the accuracy with which gesture signals can be recognized in radar data can be improved by collecting radar data over a longer time window. However, extending the window for collecting time data increases the latency between input and desired result, which is generally unacceptable to many end-users. While the latency between input by a user and action at the device can be reduced by shortening the window over which radar data is collected, this approach decreases the accuracy with which gestures are recognized and translated into action at the device, which is likewise unacceptable to most end-users. Thus, escaping the zero-sum tradeoff between accuracy and latency in translating radar signals to gesture-controlled action at the electronic device remains a source of technical challenges and opportunities for improvement in the art.

SUMMARY

This disclosure provides a method and apparatus for radar-based activity detection.

In a first embodiment, a method includes receiving from a transceiver, at a processor of an electronic device, a radar signal, the radar signal including a set of signal strength values across a range of Doppler frequency shift values and a range of time values. The method further includes extracting a time series of frequency features from the radar signal, wherein frequency features of the time series of frequency features include a determined Doppler frequency shift value for each time value of the range of time values, identifying segments within the time series of frequency features, analyzing the segments to determine a start time for a classification engine, at the start time, analyzing, by the classification engine, at least one of a subset of the time series of frequency features or a subset of the radar signal to identify a control gesture, and triggering a control input associated with the control gesture.

In a second embodiment, an apparatus includes a processor, a transceiver and a memory. The memory contains instructions, which when executed by the processor, cause the apparatus to receive from the transceiver at the processor, a radar signal, the radar signal including a set of signal strength values across a range of Doppler frequency shift values and a range of time values, extract a time series of frequency features from the radar signal, wherein frequency features of the time series of frequency features include a determined Doppler frequency shift value for each time value of the range of time values, identify segments within the time series of frequency features, analyze the segments to determine a start time for a classification engine, at the start time, analyze, by the classification engine, at least one of a subset of the time series of frequency features or a subset of the radar signal to identify a control gesture, and trigger a control input associated with the control gesture.

In a third embodiment, a non-transitory computer-readable medium contains instructions which, when executed by a processor, cause an apparatus to receive from a transceiver, at a processor of an electronic device, a radar signal, the radar signal include a set of signal strength values across a range of Doppler frequency shift values and a range of time values, extract a time series of frequency features from the radar signal, wherein frequency features of the time series of frequency features comprise a determined Doppler frequency shift value for each time value of the range of time values, identify segments within the time series of frequency features, analyze the segments to determine a start time for a classification engine, at the start time, analyze, by the classification engine, at least one of a subset of the time series of frequency features or a subset of the radar signal to identify a control gesture, and trigger a control input associated with the control gesture.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 3A and 3B illustrate, in block diagram format, two examples of processing architectures and workflows for implementing radar-based gesture detection according to various embodiments of this disclosure;

FIG. 12 illustrates operations of a method for performing radar-based gesture recognition according to various embodiments of this disclosure.

DETAILED DESCRIPTION

FIGS. 1 through 12, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
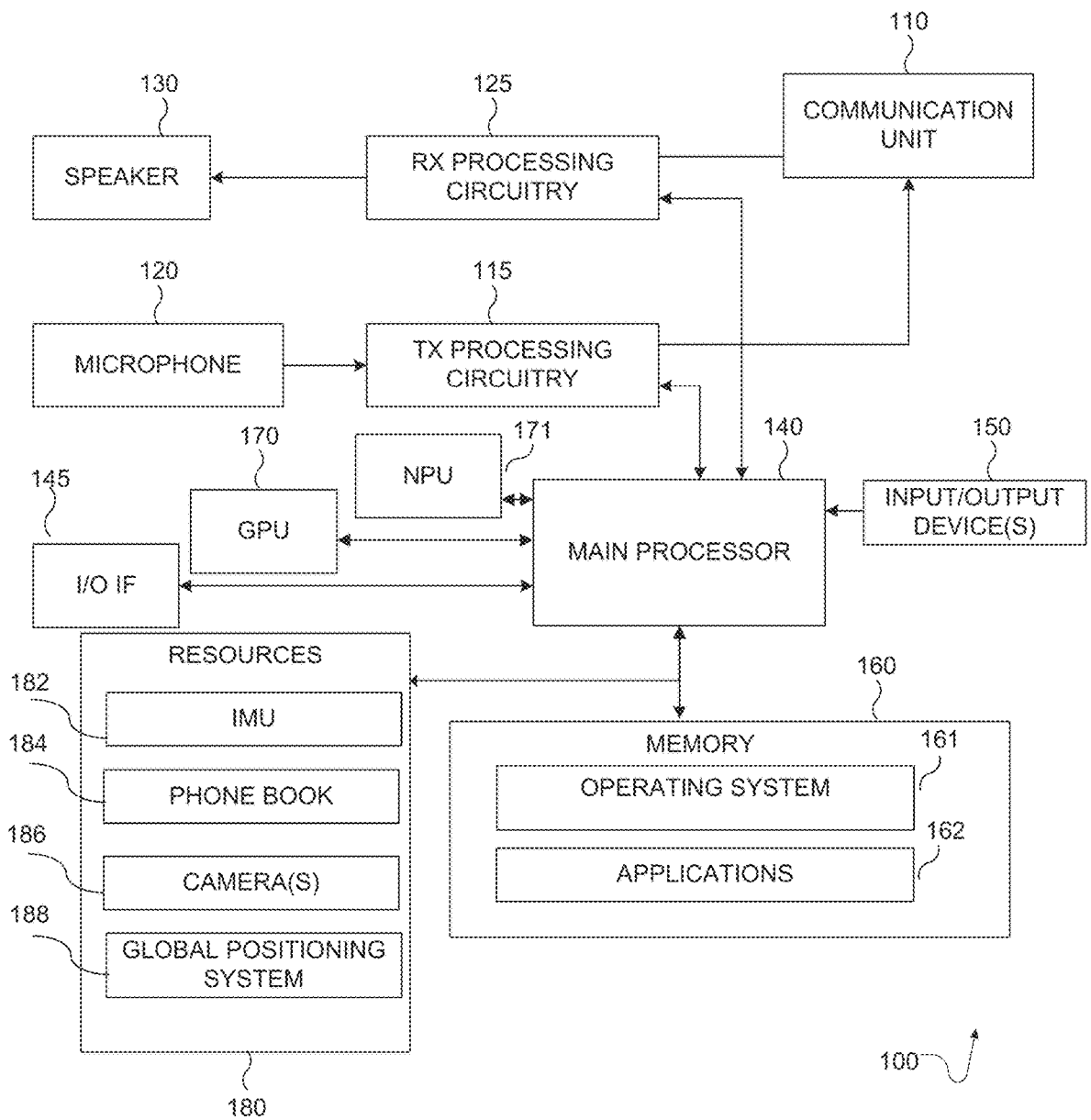
FIG. 1 illustrates an example of an electronic device for implementing radar-based activity detection, according to certain embodiments of this disclosure.

FIG. 1 illustrates an example of an electronic device for implementing radar-based activity detection, according to certain embodiments of this disclosure. The embodiment of the electronic device 100 illustrated in FIG. 1 is for illustration only, and other configurations are possible. However, suitable devices come in a wide variety of configurations, and FIG. 1 does not limit the scope of this disclosure to any particular implementation of a device.

As shown in the non-limiting example of FIG. 1, the device 100 includes a communication unit 110 that may include, for example, a radio frequency (RF) transceiver, a BLUETOOTH transceiver, or a Wi-Fi transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s)

150, and a memory 160. The memory 160 includes an operating system (OS) program 161 and one or more applications 162.

Applications 162 can include games, media playback applications, shopping applications, social media applications, applications for geotagging photographs and other items of digital content, virtual reality (VR) applications, augmented reality (AR) applications, operating systems, device security (e.g., anti-theft and device tracking) applications or any other applications which obtain user inputs and access resources of device 100, the resources of device 100 including, without limitation, speaker 130, microphone 120, input/output devices 150, and additional resources 180. Further, applications 162 may include applications containing program code that when executed by a processor, such as main processor 140, cause the processor to perform steps of methods for performing radar-based activity detection according to certain embodiments of the present disclosure.

The communication unit 110 may receive an incoming RF signal, for example, a near field communication signal such as a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

According to various embodiments, communication unit 110, in conjunction with RX processing circuitry 125 and TX processing circuitry 115 can operate as a transceiver for generating and receiving radar signals, such as specified in the next-generation IEEE 802.11ay WI-FI standard.

The main processor 140 can include one or more processors or other processing devices and execute the OS program 161 stored in the memory 160 to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170 and a neural processing unit (NPU) 171 or other processor with an architecture processing logic adapted to support large numbers of computing threads and/or implement machine learning/artificial intelligence functionalities.

According to certain embodiments, electronic device 100 includes a variety of additional resources 180 which can, if permitted, be accessed by applications 162. According to certain embodiments, resources 180 include an accelerometer or inertial motion unit 182, which can detect movements of the electronic device along one or more degrees of freedom. Additional resources 180 include, in some embodiments, a user's phone book 184, one or more cameras 186 of electronic device 100, and a global positioning system 188.

Although FIG. 1 illustrates one example of a device 100 for implementing radar-based gesture detection, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2A:
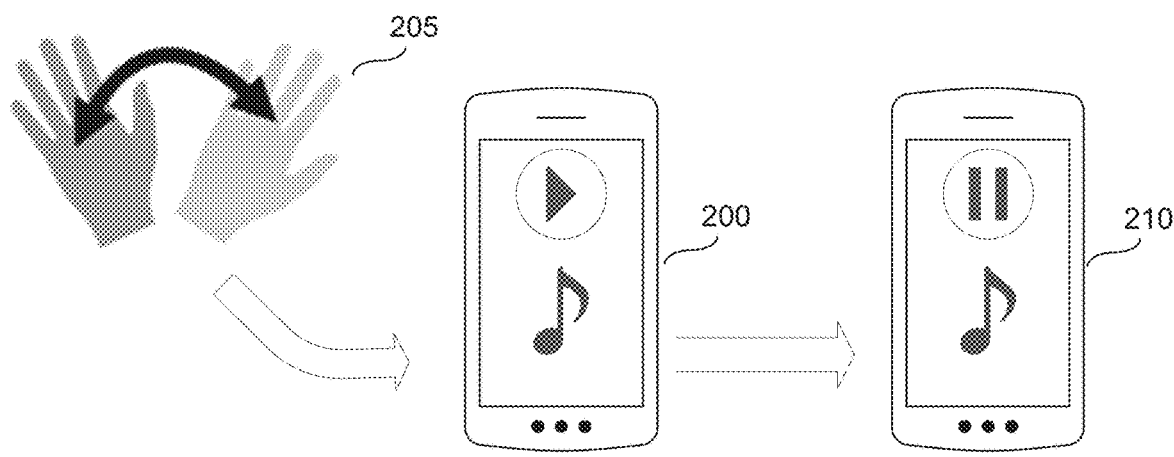
FIGS. 2A and 2B illustrate an example of radar-based gesture detection and triggering functions of a computing platform in response to radar-based gesture detection according to various embodiments of this disclosure.
Figure 2B:
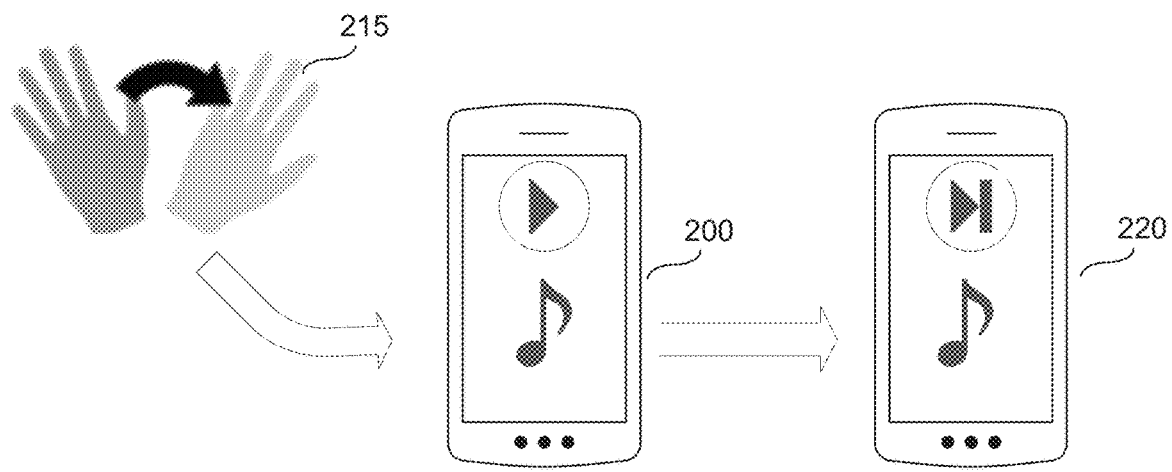

FIGS. 2A and 2B illustrate an example of radar-based gesture detection and triggering functions of a computing platform in response to radar-based gesture detection according to various embodiments of this disclosure. For convenience of cross-reference, elements common to the examples of both FIGS. 2A and 2B are numbered similarly. The embodiments of the radar-based gesture detection and triggering functions shown in FIGS. 2A and 2B are for illustration only and other embodiments can be used without departing from the scope of the present disclosure.

Referring to the non-limiting example of FIG. 2A, an electronic device (for example, electronic device 100 in FIG. 1) is shown in a first state of operation 200. In this explanatory example, first state of operation 200 comprises executing the "play" mode of a media playback application, by, for example, playing music or a podcast through an audio player application on the electronic device.

In this example, the user wishes to provide a control input triggering a "pause" action of the media playback application. In addition to tapping a region on the display of her device, or verbally providing an instruction to a digital assistant application executing on the device, in first state of operation 200, the electronic device is configured to implement radar-based gesture detection according to the present disclosure. In first state of operation 200, the transceiver of the electronic device is obtaining radar signals based on the motion of objects within the area of the device's operation. Thus, when the user moves her hand from a resting state or other pose or motion not associated with a gesture for controlling an operation of the electronic device, performs a back-and-forth wave gesture 205 and then rests or continues to move her hand in a manner unrelated to operating her device, the transceiver of the electronic device radar signals associated with the motion of her hands and arms. Certain embodiments according to this disclosure identify the subset of radar signals associated with just the control gesture for the music playback operation within the larger set of radar signals associated with the detected motion, and once a time period containing signals associated with the control gesture (also referred to herein as a "segment") are identified within the larger set of signals, the radar signals from the identified segment are further processed (for example, by a classification engine executing on the device) to identify a hand gesture in the radar signals of the identified segment. Once a hand gesture is identified, an action or control input associated with the hand gesture is triggered. In the non-limiting example of FIG. 2A, upon recognition of a back-and-forth wave, the media playback application is switched to a second state of operation 210, wherein playback is paused, pending further user inputs.

Referring to the non-limiting example of FIG. 2B, certain embodiments according to this disclosure can also segment a superset of radar data obtained over a time interval to identify other gestures for triggering functionalities of the electronic device. In this example, a "right swipe" gesture 215 is recognized in an identified subset (i.e., a segment) within a superset of radar data obtained at the device, and triggers an action switching the electronic device from first state of operation 200 to a third state of operation 220, wherein the media player advances to playing a next item of content (for example, the next song in a music playlist).

FIGS. 3A and 3B illustrate, in block diagram format, two examples of processing architectures and workflows for implementing radar-based gesture detection according to various embodiments of this disclosure. For convenience of cross-reference, elements which are common to both the example of FIG. 3A and FIG. 3B are numbered similarly. The embodiments of the processing architectures and workflows shown in FIGS. 3A and 3B are for illustration only and other embodiments can be used without departing from the scope of the present disclosure.

Referring to the non-limiting example of FIG. 3A, a first example 300 of a processing architecture/workflow comprises, at block 301, a transceiver (for example, communication unit 110 in FIG. 1) of an electronic device obtaining raw radar signals (for example, Doppler radar signals) from the movement of objects within the operating environment of the electronic device over an interval of time. According to certain embodiments, the radar set of the transceiver monitors a region of interest ("ROI") to detect whether and when a predefined human activity (for example, a gesture) occurs within an operating range of the radar. To detect the predefined human activity, the radar set emits a waveform (for example, an electromagnetic or acoustic signal) into a portion of the ROI and records, without limitation, the time and properties (for example, amplitude and phase) of the returned echo of the original waveform. In certain embodiments, the interval of time over which raw radar signals are obtained depends on the size of a circular buffer for storing radar signals in a memory (for example, memory 160 in FIG. 1) of the electronic device.

According to certain embodiments, at block 305, the raw radar data obtained at block 301 is pre-processed by one or more processors of the electronic device to obtain frames of Doppler radar information. In some embodiments, pre-processing comprises demultiplexing the raw radar signal and applying Fast Fourier Transforms as part of obtaining one or more radar frames, wherein each radar frame comprises, a set of radar signal strength values across a range of Doppler frequency components, for least one distance ranges from the transceiver (wherein each distance range is sometimes referred to as a "tap"), at a given moment in time. According to various embodiments, the radar signal obtained by the electronic device is obtained from a sweeping beam, and the radar signal at a given time is further associated with a given beam angle.

As shown in the illustrative example of FIGS. 3A and 3B, the pre-processed radar signals are passed to activity detection and recognition module 310. In the illustrative examples of FIGS. 3A and 3B, activity detection and recognition module operates to find the start and end point of a gesture or movement of interest, provide an assessment of whether the gesture or movement of interest is a valid (i.e., a predefined gesture associated with a specific control input for the electronic device) and when to trigger a fine-detail gesture recognition. According to various embodiments, activity detection and recognition module 310 is provided by a set of processes executing on at least one of a main processor (for example, main processor 140 in FIG. 1) or a neural processing unit (for example, NPU 171 in FIG. 1), or a combination thereof. In these explanatory examples, activity detection and recognition module 310 comprises the following processing stages: extraction of time-series features from the radar data (block 315); detection of relevant movements and segmentation of the time-series features (block 320); performing gesture recognition (block 325); and triggering the start of a classification engine or other computational process for fine-level recognition of the gesture from the time series of frequency features and/or radar frames (block 330).

Referring to the non-limiting example of FIGS. 3A-3B, at block 315, activity detection and recognition module 310 extracts a time series of frequency features from the processed radar signals obtained at block 315. According to various embodiments, extracting a frequency feature comprises, for a radar signal at a given tap at a given time, determining a single Doppler frequency shift value for that radar signal. By iterating such a determination over multiple times, a series of frequency features comprising point values of frequency shifts at different times can be generated. From a plot of frequency feature values over time, intervals in the time series containing movements in the frequency shift values associated with valid gestures can be identified.

As discussed elsewhere in this disclosure, the technical challenges associated with implementing radar-based gesture recognition include, achieving both low latency and high accuracy with a set level of processing resources (i.e., avoiding "brute force" solutions, such as committing all of the processing cores of a CPU to gesture recognition without regard for battery life or the performance of other applications). Certain embodiments according to this disclosure achieve improvements in reducing latency without compromising accuracy by judiciously determining when a set of radar data is ready to be passed to a classification module for further processing to recognize the specific gesture in the radar signals. In this way, certain embodiments can determine whether the data already collected is sufficient to support accurate gesture recognition, irrespective of whether a user has completed the gesture or stopped moving, or whether the data at hand is not yet sufficient to support an accurate identification of the user's motions. Where the data at hand is determined to be sufficient to support an accurate gesture recognition analysis, radar data is passed from the movement detection and segmentation stage at block 320 to the gesture recognition stage at block 325.

Still referring to the non-limiting example of FIGS. 3A and 3B, at block 320, the electronic device parses the time series data to test for conditions, which are then submitted for gesture recognition at block 325 to determine whether the data at hand likely contains a valid gesture, and whether the data at hand is sufficient for a classification to identify, with a threshold level of accuracy, the gesture in the available data. According to various embodiments, at block 325, a multi-confidence level analysis of segments within the time series of frequency features. According to certain embodiments, at block 320, the processor determines whether the time series of frequency features generated at block 315 satisfies one or more predefined conditions. Examples of predefined conditions include, without limitation, zero crossings and peaks in the time series. Intervals where the time series of frequency features satisfies a particular condition, or as may be the case, a set of conditions, are designated as segments, or intervals containing radar data from which a gesture may, based on the data on hand, or based on the data on hand plus future data, be recognized. At block 325, the identified segments are further analyzed to determine whether conditions indicating a satisfactory confidence level of obtaining an accurate gesture recognition based on at least one of the time series of frequency features and the radar data at hand are met. Where the time series of frequency features satisfies conditions showing, with a sufficient level of confidence, that the gesture can be accurately recognized based on the time set of frequency features or the underlying radar data, operation of a classification engine or other computational process for identifying the gesture is triggered at block 330. By contrast, where the time series of frequency features do not satisfy conditions indicating that a gesture can be recognized with the presently available data, further radar data may be collected before a fine-detail identification of a gesture in the available data is triggered at block 330.

In certain embodiments, at block 325, gesture recognition is performed to analyze the time series of frequency features to determine whether the data at hand is sufficient for further analysis by a classification engine, or whether more data needs to be collected before triggering a classification engine. When the gesture recognition at block 325 determines that the data at hand contains some kind of valid gesture, and that there is a sufficient likelihood that the gesture can be accurately recognized, a start of a classification engine is triggered at block 330.

In some embodiments, such as shown in FIG. 3A, the classification engine (as used in this disclosure, the term "classification engine" encompasses a model or computational process that generates an identification of a specific user gesture in a data set which has been identified as likely to contain a valid gesture) as part of activity detection and recognition module 310. In various embodiments, such as shown in the illustrative example of FIG. 3B, in second architecture 350, fine level gesture recognition may be performed by a classification engine embodied as standalone gesture recognition module 335 (for example, a neural network implemented by an NPU).

According to various embodiments, once the classification engine has identified a gesture from at least one of the time series of frequency features or radar frames, a subsequent determination of an action to be performed at the electronic device, or a control input for an application running on the device is performed. In certain embodiments, the determination of the action/control input is based on a fixed, or context-agnostic association between the gesture and the action to be initiated at the electronic device. For example, in some embodiments, a back-and-forth wave may cause the display of the device to light up, regardless of what application(s) are currently running on the device. Such a functionality may be useful for users trying to locate their devices in a dark room. As another, purely illustrative example, depending on context, the same back-and-forth gesture may trigger different control inputs. For example, if a media playback application is running in the foreground of the electronic device, radar-based recognition of a back-and-forth gesture may trigger a "pause playback" command for the media playback application. However, if a navigation application is running in the foreground of the electronic device, and there is contextual information showing that the electronic device is moving, recognition of a back-and-forth hand gesture may trigger an input to display the next turn the user needs to make to follow a preset route. Numerous variations are possible and are within the contemplated scope of this disclosure.

Figure 4A:
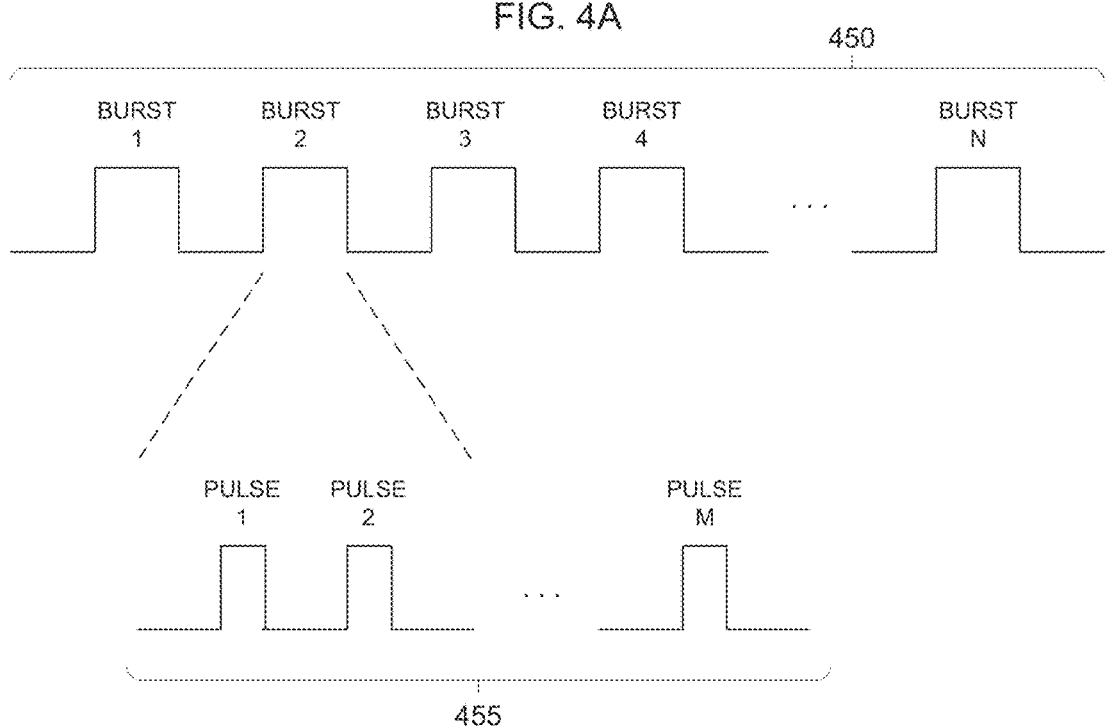
FIGS. 4A-4C illustrate examples of radar signal timing and radar frames according to certain embodiments of this disclosure.
Figure 4B:
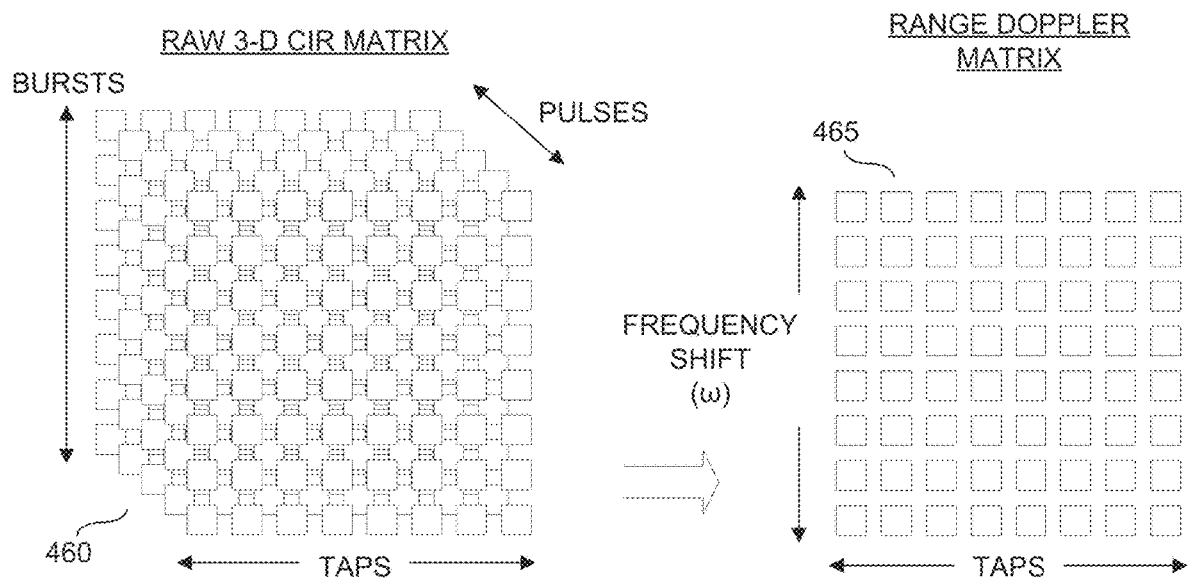
Figure 4C:
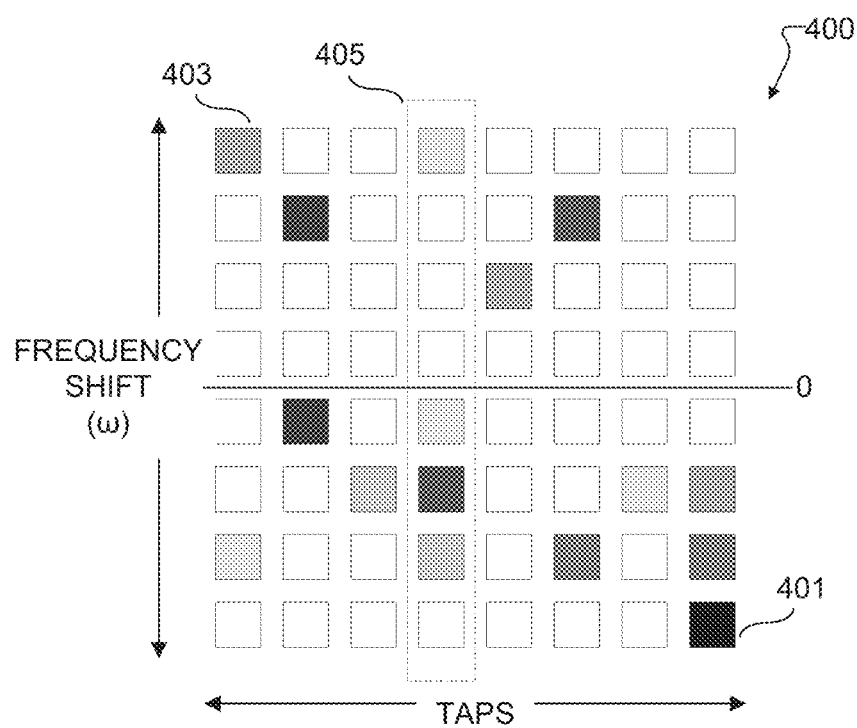

FIGS. 4A through 4C illustrates aspects of how a radar frame 400 can be generated from a raw radar signal according to certain embodiments of this disclosure. The embodiment of the radar frame 400 shown in FIG. 4C is for illustration only and other embodiments can be used without departing from the scope of the present disclosure.

Referring to the non-limiting example of FIGS. 4A-4C, radar frame 400 is a frame generated by preprocessing a raw radar signal (for example, in block 305 of FIG. 3A), to obtain, for a given time, a set of doppler frequency shift signal strengths across a plurality of taps. While the examples of FIGS. 4A-4C are described with reference to embodiments of a pulse compression radar, the present disclosure is not limited thereto, and embodiments using other types of radar, such as frequency modulated continuous wave (FMCW), phase modulated continuous wave (PMCW) and Doppler radar are within the contemplated scope of this disclosure.

In the illustrative example of FIG. 4A, aspects of the timing structure of a raw radar signal according to various embodiments of this disclosure are shown in the figure. In some embodiments, radar measurements of the region of interest (ROI) of the electronic device over time are obtained by quantizing time into frames, such as frame 450 in FIG. 4A. Further each frame is further subdivided into bursts (for example, burst 455), such as bursts 1-N of frame 450. During each burst, a plurality of pulses (for example, pulses 1-M) during which the radar transmits a waveform and receives a reflected echo of the waveform, from which a pulse measurement can be obtained. According to various embodiments, the constituent pulses of each burst of a frame provide a full scan of the radar field of view of the ROI, and by repeating the bursts within a frame, the temporal variations (i.e., Doppler frequency shifts) across bursts can be recorded. In some embodiments, each pulse or burst within a frame may have a unique transmit and receive antenna configuration, referring to the active set of antenna elements used to transmit the pulse, and the beamforming weights assigned across each antenna element. While, in the non-limiting example of FIG. 4A, the bursts and pulses of frame 450 are shown as being uniformly spaced in time, there is no requirement that pulses and bursts be timed this way, and other choices of spacings between pulses and bursts are within the contemplated scope of this disclosure.

Referring to the non-limiting example of FIG. 4B, the measurements obtained from the radar pulses of frame 450, can be expressed as a three-dimensional complex impulse response (CIR) matrix 460. In this illustrative figure, each measurement obtained during frame 450 is represented as a square within 3-D CIR matrix 460. As shown in FIG. 4B, a first dimension of 3-D CIR matrix 460 is the burst index, which corresponds to an identifier of which burst within the frame a measurement was obtained in. A second dimension of 3-D CIR matrix 460 is a pulse index, which corresponds to an identifier of pulses having equivalent measurement parameters (such as antenna configurations or beamforming weights). A third dimension of 3-D CIR matrix 460 is a delay tap (often referred to as "tap") index, which translates to a range of the point of reflection of a radar signal, or equivalently, the time of flight of the received signal.

As shown in the illustrative example of FIG. 4C, a radar frame comprising a range doppler matrix 465 can be obtained by reducing the dimensionality of 3-D CIR matrix 460, by re-expressing the burst/pulse values as values of a single variable—a signal strength for a Doppler frequency shift. According to various embodiments, this reduction is achieved by averaging the values in the pulse dimension and then performing a Fourier transform in the dimension of the bursts.

As shown in the illustrative example of FIG. 4C, a radar frame 400 can be obtained from a range doppler matrix (for example, range doppler matrix 465 in FIG. 4B). According to various embodiments, radar frame 400 comprises a set of 64 signal strength measurements taken across 8 doppler frequency shift intervals over eight different ranges (also referred to as "taps") from the transceiver. Each column within radar frame 400 comprises a set of signal strength measurements across a frequency range for a given tap index (for example, fourth tap index 405). Other embodiments, comprising smaller or greater numbers of taps or Doppler frequency shift intervals, are possible, and within the contemplated scope of this disclosure.

In the explanatory example of FIG. 4C, tap/frequency combinations associated with strong signal strengths (which more strongly correlate to a radio signal from the transceiver impinging upon a moving object, and being redetected by the receiving end of the transceiver with a phase shift proportional to the velocity of the object's movement) are shown with darker shading. Similarly, tap/frequency combinations associated with weak signal strengths (which generally correlate to an absence of moving objects or ambient noise) are shown in with lighter or no shading.

For example, first signal strength measurement 401, which corresponds to the most negative Doppler frequency shift value (i.e., a frequency shift associated with an object moving at the highest detected rate away from the transceiver) at the highest tap index (i.e., the most distant range in the working range of the transceiver) is shown in black, which correlates to a strong signal strength.

As a second example, second signal strength measurement 403, which corresponds to the most positive Doppler frequency shift value (i.e., a frequency shift associated with an object moving at the highest detected rate towards the transceiver) at the lowest tap index (i.e., the closest range in the working range of the transceiver) is shown in medium gray, which correlates to a signal strength which is strong, but not as strong as first signal strength measurement 401.

Figure 5:
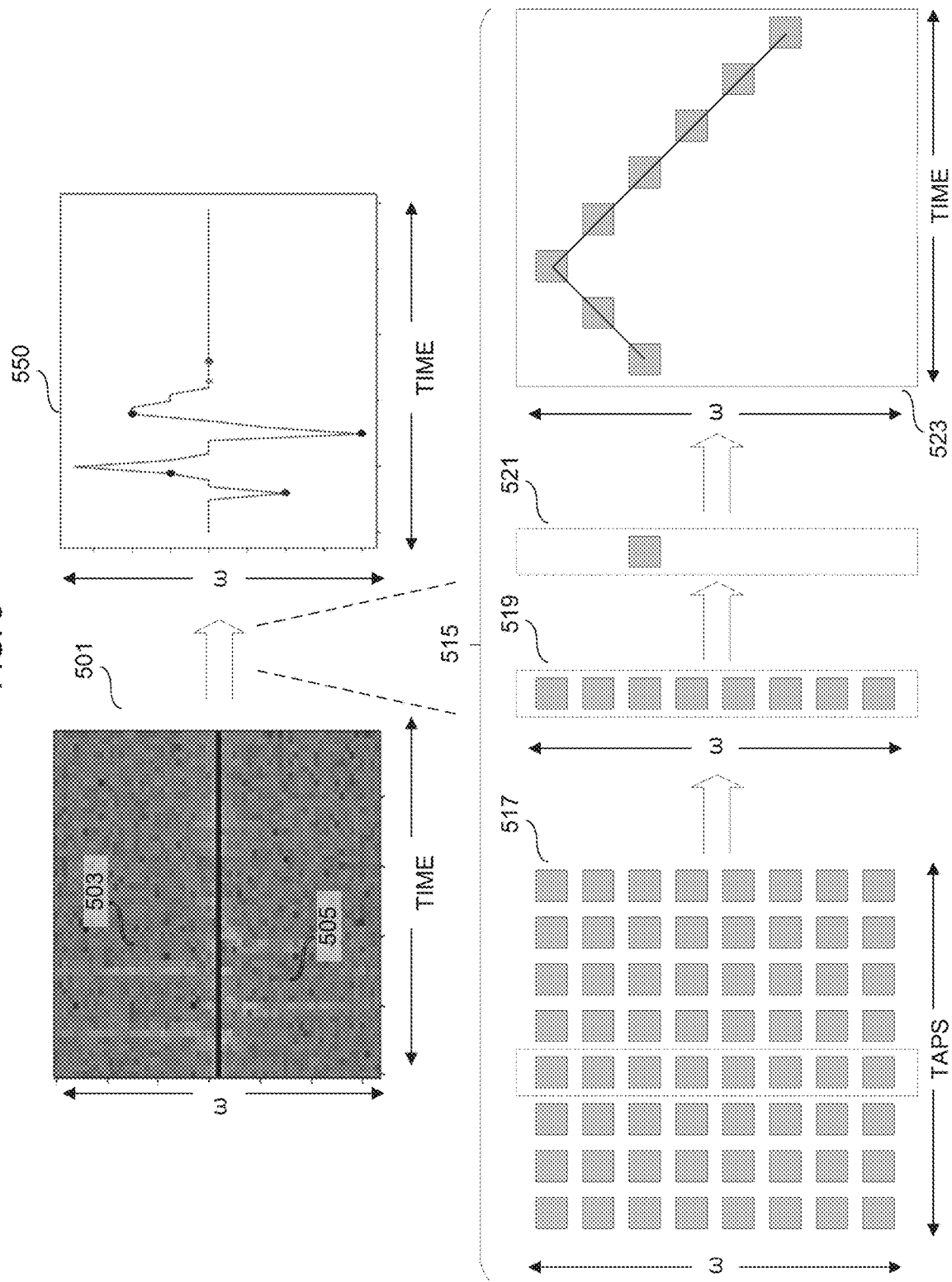
FIG. 5 illustrates aspects of extracting a time series of frequency features from radar frames, according to certain embodiments of this disclosure.

FIG. 5 illustrates aspects of extracting a time series of frequency features from radar frames, according to certain embodiments of this disclosure. For convenience of cross-reference elements of FIG. 5 described in other figures are numbered similarly. The embodiment of the time series of frequency features shown in FIG. 5 is for illustration only and other embodiments can be used without departing from the scope of the present disclosure.

Referring to the non-limiting example of FIG. 5, a time series 501 of radar frame data from a single tap index (for example, fourth tap index 405 in FIG. 500) is shown on the left side of the figure. In the non-limiting example of FIG. 5, the signal strengths of Doppler frequency shifts across a range of positive and negative shift values over time are shown. In this example, the coding of shading color relative to signal strength is reversed from that of the example of FIG. 4C, with lighter shading used to denote stronger signal strengths and darker shading used to denote weaker signal strengths. In this example, time series 501 shows that while the radar measurements at this particular tap are noisy, with patches of dark and light signals interspersed throughout time series 501, a point cloud of strong signals with two positive frequency peaks (including positive peak 503) and two negative frequency peaks (including negative peak 505) can be discerned in the radar data. While it is possible, and sometimes necessary, to pass some radar data, such as time series 501 to a neural network, or a machine learning (ML) object recognition model to recognize a radar signal associated with a valid control gesture, passing all such time series radar data to a neural network can be computationally expensive and potentially wasteful, in that typically only a small fraction of the available time series radar data is associated with a valid gesture.

To avoid wasteful use of computationally intensive processes, such as neural networks and ML object recognition models on radar data for which there is little to no likelihood of recognizing a valid gesture, certain embodiments according to this disclosure generate a time series of frequency features (for example, time series 550) from the time series 501 of radar frame data, comprising a simplified representation in two dimensions (Doppler frequency shift and time) of the radar frame data, which, as described herein, is analytically tractable, and from which, segments of radar data likely containing valid gestures can efficiently be identified.

According to various embodiments, the process 515 for obtaining time series 550 from the radar data of time series 501 comprises, for a given time, t obtaining a radar frame 517 comprising a range Doppler matrix of measurements obtained at different Doppler frequencies obtained at a given instant in time. As the measurement signals due to the movement of an object of interest (for example, a hand) may straddle multiple ranges from the electronic device, a first step is to determine a representative range 519 (expressed as a tap index) from which Doppler frequency measurements will obtained. In certain embodiments according to this disclosure, the determination of a tap index which corresponds to a representative range may be performed in one of at least two ways. According to a first mode, Doppler frequency measurements are selected from a single tap index within radar frame 517 based on a determination that the particular tap index best corresponds to the range at which relevant motion is likely to be measured. According to a second mode, Doppler frequency data is collected from multiple ranges (i.e., tap indices) and the Doppler frequency data from the multiple tap indices is combined to create a synthesized tap.

According to certain embodiments, once a representative range (or synthesis of data across multiple ranges) associated with the movement of interest is determined, a determination of a frequency feature 521 comprising single Doppler frequency or range of Doppler frequencies which best represent the movement of the user's limbs. As discussed further with reference to the explanatory example of FIG. 6, in some embodiments, the data from representative range 519 is first filtered to remove background noise, and then a weighted average of the remaining Doppler frequency measurements is calculated to obtain the frequency feature 521. By calculating frequency feature values over a succession of frames, a time series of frequency features 523 can be obtained.

Figure 6:
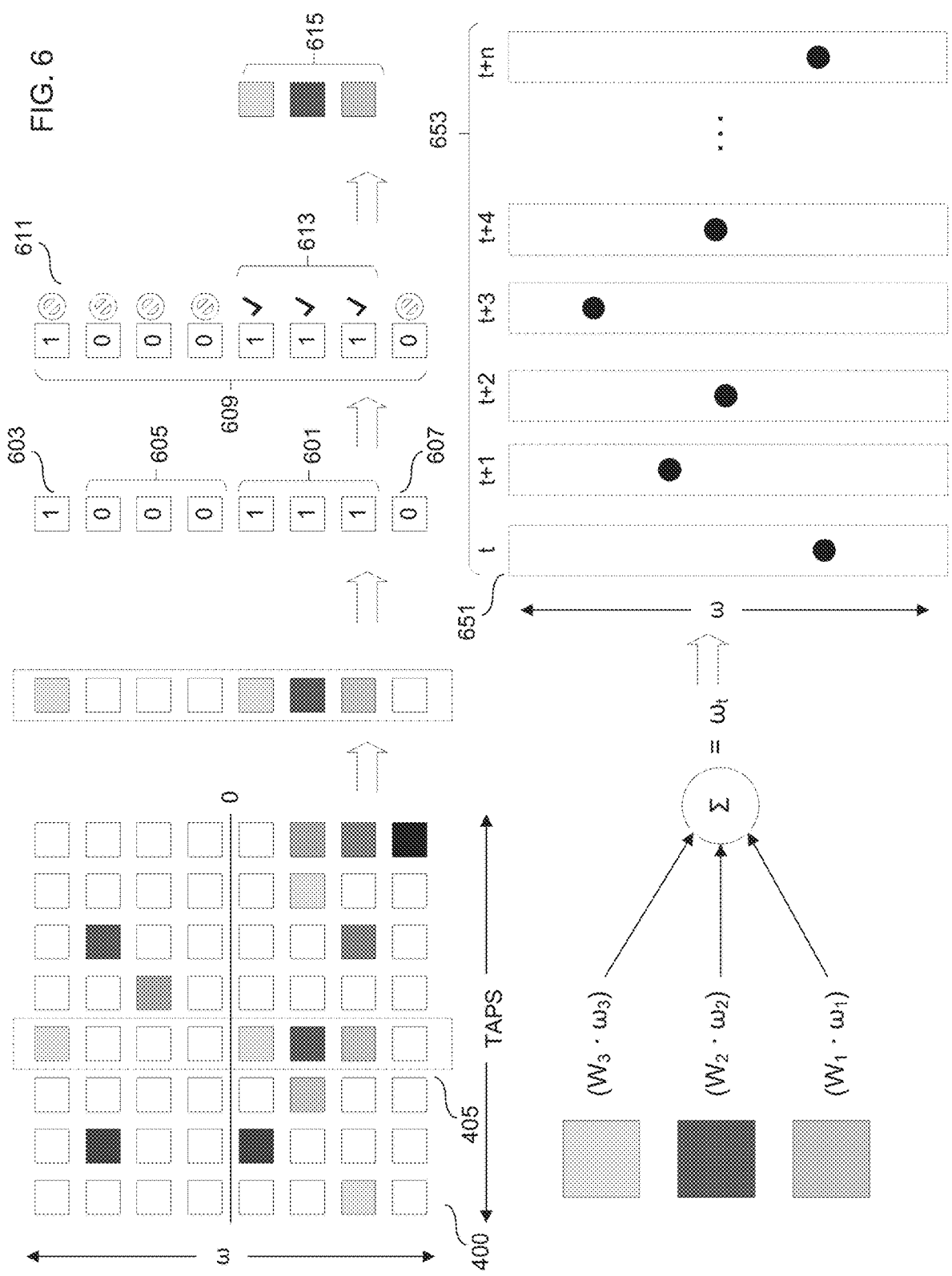
FIG. 6 illustrates an example of extracting a frequency feature at a time t from a radar frame 400 for time t, according to various embodiments of this disclosure.

FIG. 6 illustrates an example of extracting a frequency feature 651 at a time t from a radar frame 400 for time t, according to various embodiments of the present disclosure. For convenience of cross-reference, elements common to FIG. 4C and FIG. 6 are numbered similarly. The embodiment of the frequency feature 651 shown in FIG. 6 is for illustration only and other embodiments can be used without departing from the scope of the present disclosure.

Referring to the non-limiting example of FIG. 6, a radar frame 400 obtained at a time t is shown. In this illustrative example, signal strength data from only a portion of radar frame 400—in this case, fourth tap index 405 is used for feature extraction. In some embodiments, and as discussed further with reference to the example of FIG. 7, in some embodiments, larger portions (or potentially all) of radar frame 400 may be used for frequency feature extraction. The number of taps from radar frame 400 used for frequency feature extraction can, in various embodiments, depend on a number of factors, including, without limitation, contextual information (for example, whether any motion or relevant motion has been recently detected) and the available processing resources.

As noted elsewhere in this disclosure, the challenges of working with radar data can include high levels of noise in radar. Accordingly, in certain embodiments, the portion of radar frame 400 used for frequency feature extraction is initially denoised. In some embodiments, denoising comprises filtering out data from those frequency ranges where the measured signal strength falls below a signal-to-noise threshold value. In this example, half of the measurements from fourth tap index 405, specifically a first cluster 605 of positive frequency shift values and a negative shift value 607 fall below the signal-to-noise threshold. Similarly, a second cluster 601 of negative frequency shift values and a positive frequency shift value 603 exceed the signal-to-noise threshold. According to various embodiments, the results of the comparison of the signal strengths at shift frequencies relative to the signal-to-noise threshold can be represented by a binary string 609, with values of "0" for the frequency ranges in which the signal strength was below the signal-to-noise threshold and values of "1" for the frequency ranges in which the measured signal strength exceeded the signal-to-noise threshold.

Recognizing that, in most embodiments, valid control gestures come from movements of a human body and that the moving parts of the human body are interconnected, (i.e., fingers connect to hands, which connect to arms) a clustering analysis (for example, applying a K-means clustering algorithm) can be applied to binary string 609 to filter out isolated signals from the movement of unconnected, or isolated objects in the scan path. In this non-limiting example, performing clustering filters out signal 611, which while above the signal-to-noise threshold, is isolated from any other above-threshold signals, and thus, unlikely to be from a finger, hand, arm or other source of a valid gesture input. Similarly, the second cluster 613 of above-threshold frequency shift measurements are not filtered out, as their clustering is indicative of the signals reflecting the movement of the source (i.e., a moving hand connected to a moving arm) of a valid gesture.

Denoising and clustering the eight frequency shift signals from the fourth tap index 405 of radar frame 400, a first frequency feature 651 is determined based on a weighted mean of the subset 615 of three of the original eight Doppler frequency shift signals. According to certain embodiments, the weighted mean of 615 is determined based on equations (1) and (2) below:

$$f_d = \sum_{i=1}^{N} w_i f_{d_i} \quad (1)$$

$$w_i = \frac{p_i}{\sum_{i=1}^{N} p_i} \quad (2)$$

Where $f_d$ is a single frequency shift value (shown as $\omega_t$ in FIG. 6), $w_i$ is the weight (shown as W in FIG. 6) to be given to the ith frequency shift value, and $p_i$ is the measured signal strength at the ith frequency shift value. As shown in the illustrative example of FIG. 6, by iterating the process used to generate frequency feature 651 and using at least part of a radar frame obtained at a subsequent to time t, denoising and clustering the radar frame data to filter out signals unlikely to be associated with objects providing a valid gesture and generating a weighted mean of the filtered signals, a time series 653 of single frequency shift values over a time interval can be obtained. As discussed herein, segments, or intervals of radar data likely to contain valid gesture inputs can efficiently be identified from the time series in a way that is significantly more computationally efficient than analyzing a time series (for example, time series 501 in FIG. 5) of radar data.

Figure 7:
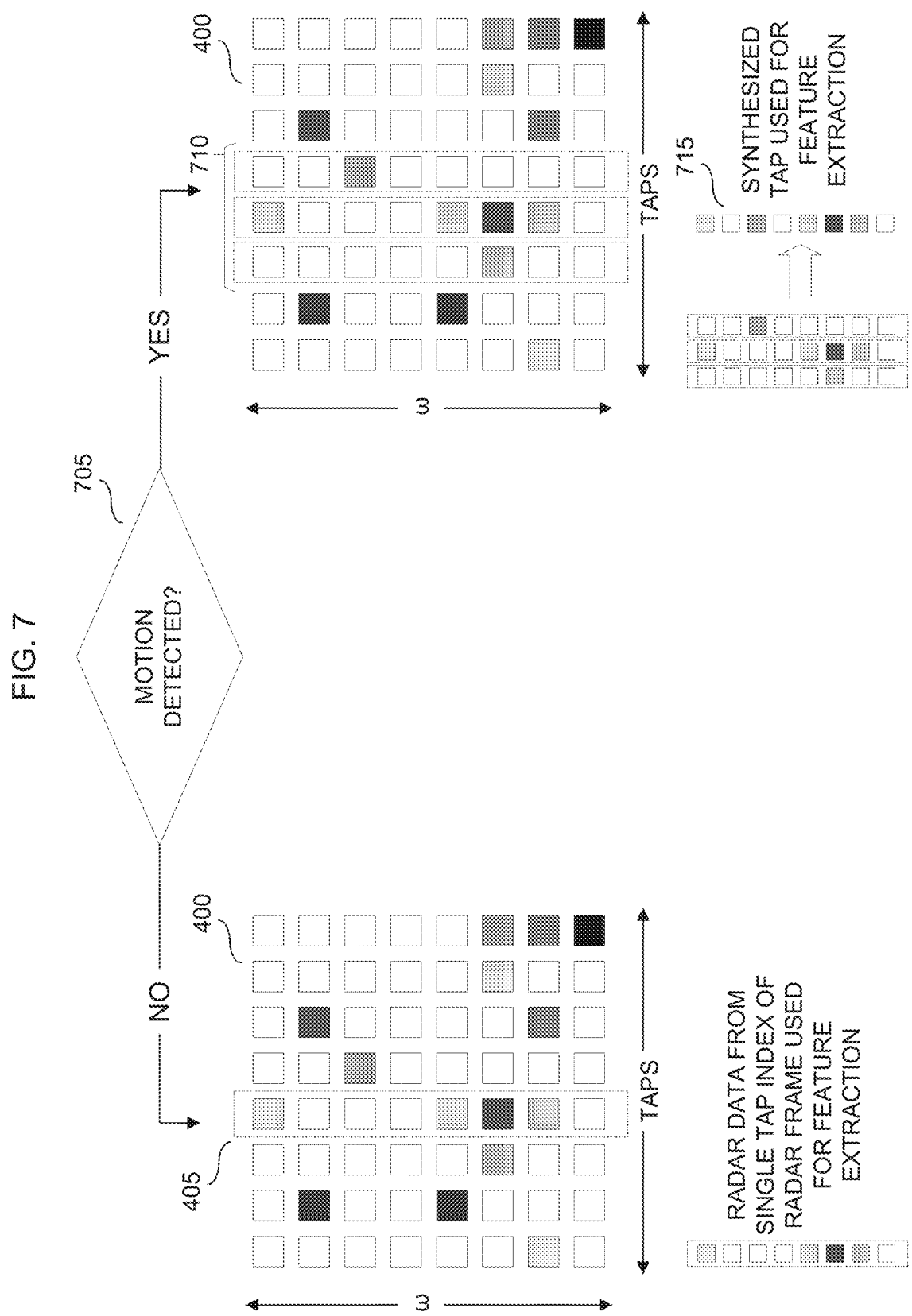
FIG. 7 illustrates an example of using radar data taken across multiple tap indices for generating a frequency feature, according to various embodiments of this disclosure.

FIG. 7 illustrates an example of using radar data taken across multiple tap indices for generating a frequency feature, according to various embodiments of this disclosure. For convenience of cross reference, elements shown in FIG. 7 which are common to other figures of this disclosure are numbered similarly. The embodiment of using radar data taken across multiple tap indices for generating a frequency feature shown in FIG. 7 is for illustration only and other embodiments can be used without departing from the scope of the present disclosure.

The challenges of effectively implementing radar-based gesture detection include, without limitation, conserving processing resources and, in embodiments implementing radar-based gesture detection on mobile computing platforms, conserving battery resources. As noted elsewhere in this disclosure, certain computational processes, such implementing a neural network or ML object recognition model can consume significant processing and battery resources. To meet the challenges of conserving processing and battery resources and implementing radar-based gesture recognition in a computationally efficient manner, certain embodiments according to this disclosure can, switch between using radar frame data from a single tap indices (which requires less processing to obtain a frequency feature) to using radar frame data taken from multiple tap indices (which, while more computationally expensive, can improve the accuracy and speed with which relevant segments of radar data are identified).

Referring to the non-limiting example of FIG. 7, in certain embodiments, the control logic for generating frequency features includes a conditional decision block, wherein the control logic determines, whether, based on the current state of the electronic device, or recent radar data, to prioritize efficiency in obtaining frequency features, or increasing the depth of the data used to generate the frequency feature. In the illustrative example of FIG. 7, at block 705, the control logic for generating frequency features checks to see whether motion has been detected within a threshold time interval. When no motion has been detected, frequency data from a single tap index 405 of radar frame 400 obtained at time t is used to extract the frequency feature for time t. However, when motion is detected at block 705, the control logic extracts the frequency feature from radar data from a set of tap indices 710. In certain embodiments, set of tap indices 710 comprises the tap index used when no motion is detected at block 705, as well as radar data from two adjacent tap indices. In certain embodiments, a synthesized tap 715 can be generated based on a normalized sum of the signal strength data at each frequency, and frequency features extracted from synthesized tap 715.

Figure 8:
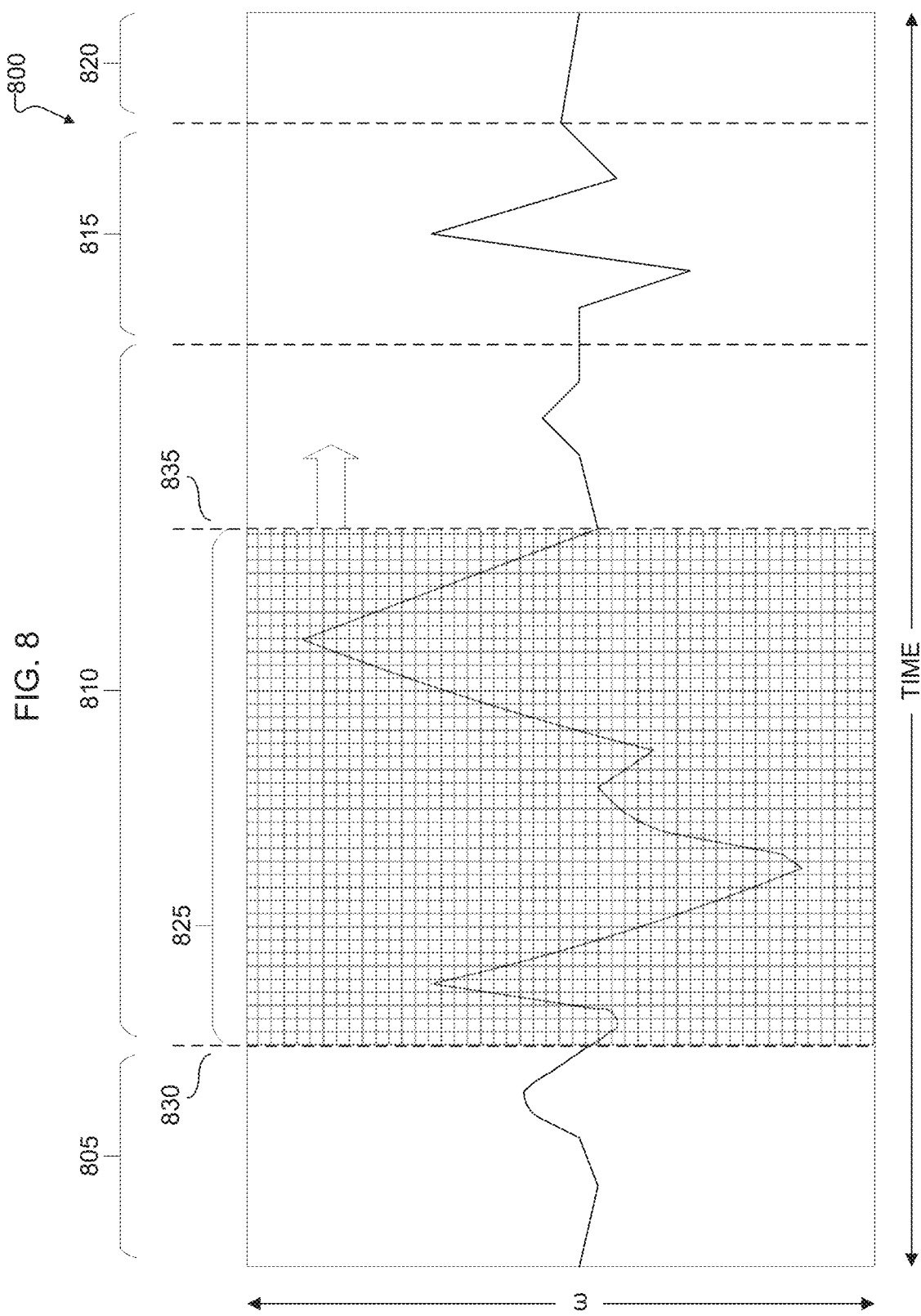
FIG. 8 illustrates an example of identifying and analyzing segments to determine a start time for a classification engine or other computational process for identifying user gestures from radar data obtained over a temporal window of interest according to certain embodiments of this disclosure.

FIG. 8 illustrates an example of identifying and analyzing segments to determine a start time for a classification engine or other computational process for identifying user gestures from radar data obtained over a temporal window of interest according to certain embodiments of this disclosure. The embodiment of the identifying and analyzing segments shown in FIG. 8 is for illustration only and other embodiments can be used without departing from the scope of the present disclosure.

Referring to the non-limiting example of FIG. 8, a time series 800 of frequency features (for example, time series 653 in FIG. 6) is shown in the figure. In this example, time series 800 comprises frequency features extracted from radar data over four time intervals. During first interval 805, a user is moving in a way that generates radar signals but has not begun a valid control gesture (for example, a quick back-and-forth wave). Second interval 810 is bounded by a user starting and finishing making a valid control gesture, which, if correctly recognized by an electronic device, can trigger a control input or action at the electronic device. Still referring to the non-limiting example of FIG. 8, during third interval 815, the user is still moving (and generating radar signals) but has completed making the movements of the valid control gesture. Finally, in fourth interval 820, the user is no longer moving in a way that a radar sensor of the electronic device can detect.

Certain embodiments according to the present disclosure identify segments within the time series of frequency features and analyze the segments to determine a start time for a classification engine or other computational process for identifying a gesture from a time-bounded subset of the available radar data. In the illustrative example of FIG. 8, a segment 825 is shown in the figure. According to various embodiments, segment 825 is bounded by the start time 830 of the gesture, and a start time 835 when radar data of collected over the duration of segment 825 is passed to a classification engine (for example, the classification engine shown in block 325 of FIG. 3A) for recognition of a gesture.

According to certain embodiments, start time 835 is a tunable parameter whose value can be determined based on, without limitation, the confidence with which the radar data within segment 825 is: a.) associated with a valid gesture; and b.) sufficient to accurately identify the gesture. In some instances, the radar data may be such that a high level of confidence that conditions a.) and b.) are satisfied can be determined while the user is still performing the gesture. In such cases, start time 835 is determined to be a time within second interval 810. In other instances, the radar data obtained during second interval 810 is such that a requisite level of confidence that conditions a.) and b.) are satisfied cannot be obtained during second interval 810, start time 835 is pushed back into one of third interval 815 or fourth interval 820. As described elsewhere in this disclosure, certain embodiments according to this disclosure determine start time 835 that is computationally efficient and optimizes the tradeoff between latency and accuracy in radar-based gesture detection.

Figure 9:
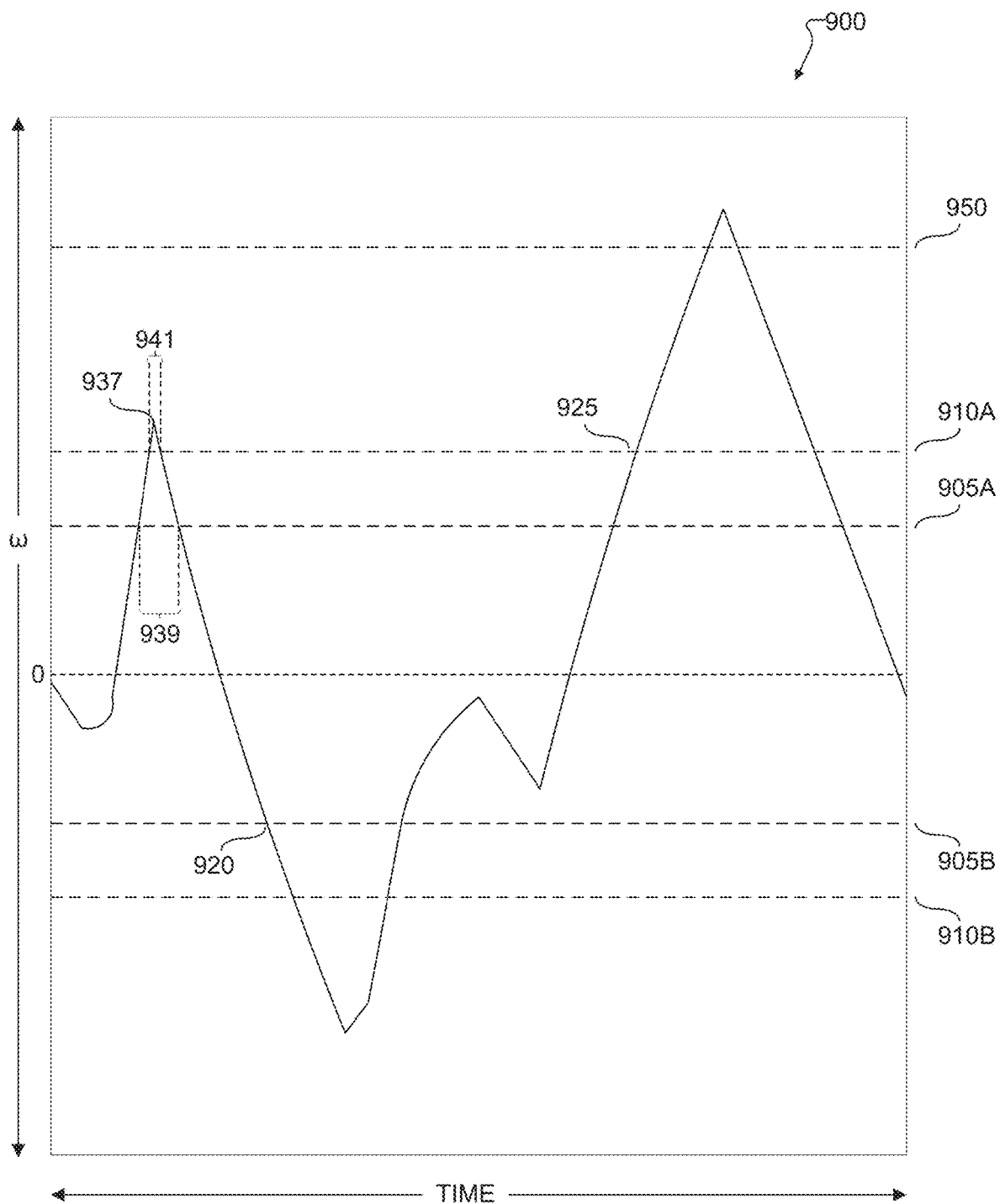
FIG. 9 illustrates an example of analyzing a segment to determine a start time for a classification engine according to various embodiments of this disclosure.

FIG. 9 illustrates an example of analyzing a segment to determine a start time for a classification engine according to various embodiments of this disclosure. The embodiment of the analysis shown in FIG. 9 is for illustration only and other embodiments can be used without departing from the scope of the present disclosure.

Referring to the non-limiting example of FIG. 9, a time series of frequency features 900 (for example, segment 825 in FIG. 8) is shown in the figure. The radar data from which time series of frequency features 900 was extracted may or may not yet be sufficient to show whether: a.) the radar data is associated with a valid gesture; and b.) the radar data is such that there is a suitable probability that the classification engine can correctly identify the gesture from the radar data.

Certain embodiments according to the present disclosure analyze segment containing time series of frequency features 900 by testing for whether, when, and how often the time-series of frequency features satisfies one or more predefined conditions. Examples of predefined conditions include, without limitation, zero crossings, peak values, and peak width and/or peak prominence conditions.

According to certain embodiments, a zero crossing comprises an instance where a plot of a time series both crosses the x-axis, as well as an upper amplitude threshold and a lower amplitude threshold. For example, a first level zero crossing 920 is recorded when the time series data crosses first positive amplitude threshold 905A, then crosses the x-axis (i.e., ω=0), and then crosses first negative amplitude threshold 905B. Similarly, a second level zero crossing 925 is recorded when the time series data crosses second negative amplitude threshold 910B, then crosses the x axis, and then crosses second positive amplitude threshold 910A.

As shown in the non-limiting example of FIG. 9, analysis of time-series data in a segment further includes testing for peaks which satisfy predefined conditions. Examples of predefined conditions which peaks can be tested for include, without limitation, amplitude peaks, peak width and peak prominence. According to various embodiments, a peak can satisfy an amplitude criterion by exceeding one or more predefined thresholds. For example, peak 937 exceeds both first positive amplitude threshold 905A and second positive amplitude threshold 910A. Accordingly, in some embodiments, peak 937 is recorded as a second level peak.

In some embodiments, to be recorded, peaks must also satisfy a peak width criterion. In some embodiments, the peak width criterion refers to the time interval in which the time series exceeds an amplitude threshold. Referring again to the illustrative example of peak 937, this peak has two widths, a first width 939, associated with the duration in which the time series around peak 937 is above first positive amplitude threshold 905A, and a peak width 941 associated with the duration in which the time series around peak 937 is above second positive amplitude threshold 910A. As shown in the figure, the time series spends comparatively little time above second positive amplitude threshold 910A relative to how much time it spends above first positive amplitude threshold 905A. Accordingly, depending on the threshold for a peak width criterion, because peak 937 briefly exceeds second positive amplitude threshold 910A, due to its limited width, peak 937 is recorded as a first level peak.

In some embodiments, peaks may be further subjected to a prominence criterion. According to various embodiments, a prominence criterion measures the height of a peak relative to temporally adjacent peaks, to exclude noise signals (for example, transient up and down "blips") in a signal. Where a first peak is small relative to another, temporally adjacent second peak, the first peak may be determined as failing to satisfy a prominence criterion.

According to various embodiments, the values of the criteria (for example, amplitude thresholds) for testing for predefined conditions in the time series data are dynamically adjustable and can be tuned to improve the system's accuracy and sensitivity to predefined conditions. As one non-limiting example, one or more adjustment thresholds may be implemented. For example, where the time series of frequency feature data crosses upper adjustment threshold 950 with a frequency suggesting that a user has particularly high or low amplitude gestures, the values of one or more of first positive amplitude threshold 905A or second positive amplitude threshold 910A may be tuned in response. Similarly, other adjustment thresholds may be implemented to variously tune the values of the negative amplitude thresholds or prominence criteria.

According to certain embodiments, testing for whether, when, and how often the time-series data satisfies one or more predefined conditions is not computationally expensive, and the tests for predefined conditions can be concatenated using logical operators (for example, "IF," "AND," "OR" and "THEN") to develop rulesets for controlling the collection of frequency features (for example, whether to use radar data from a single or multiple tap indices) as well as gesture recognition (for example, whether to pass the available frequency feature and/or radar data to a classification engine, or whether to obtain further frequency feature/radar data). TABLE 1, below, provides an example, according to some embodiments of this disclosure, of control logic comprising rulesets which use logical operators to concatenate computationally lightweight tests for predefined conditions.

TABLE 1

| Ruleset No. | "IF" | "THEN" |
|---|---|---|
| 1 | The non-noise Doppler value of the time-series signal is larger than 3. | A movement is detected. |
| 2 | Movement is detected AND Among first 6 time frames, more than 4 consecutive frames' Doppler values do not exceed 3. | Movement is not a valid gesture. |
| 3 | The number of level 1 zero-crossings is larger than 2 OR (The number of level 2 zero-crossings is larger than 1 AND The number of level 1 peak is larger than 2) | Movement is a valid gesture which may not have yet ended AND Start of classification engine is NOT triggered. |
| 4 | Ruleset 3 is satisfied AND (There are at least 2 level 2 zero-crossings AND There are at least 2 consecutive frames with the same Doppler value) | Movement is a valid gesture AND Start of classification engine is to be triggered immediately. |
| 5 | Ruleset 3 is satisfied AND (The number of consecutive frames with the same Doppler value is larger than 6 OR the number of consecutive frames with Doppler value of 0 is larger than 4) | Movement is a valid gesture that has ended AND Start of classification engine is be triggered immediately. |
| 6 | Ruleset 3 is satisfied AND The total number of frames of the detected signal in the buffer is larger than 40 | Time series signal already contains most of the valid gesture information AND Start of classification engine is to be triggered immediately AND Do not process next 4 frames in order to eliminate possible interference from tail end of already detected signal. |

TABLE 1-continued

| Ruleset No. | "IF" | "THEN" |
|---|---|---|
| 7 | Ruleset 3 is NOT satisfied AND (The total number of frames of the detected signal is larger than 40 OR The number of consecutive frames having the same Doppler value is larger than 8 OR There are 12 consecutive frames in which a zero-crossing is not observed) | There is a high probability that the radar signal is not associated with a valid gesture. |
| 8 | Ruleset 7 is satisfied AND (The cross-correlation of the first half of the detected signal with the second half of the detected signal is larger than 0.5 AND A lowest mis-detection mode is selected) | Start of classification engine is to be triggered immediately to determine if the gesture is a valid gesture. |
| 9 | Ruleset 7 is satisfied AND (A low false-detection rate mode is selected) | The signal is not from a valid gesture AND The buffer is cleared |

As shown in the illustrative example of TABLE 1 above, tests for predefined conditions can be concatenated to not only establish control logic for determining a start time for a classification engine (i.e., when the available data provides a sufficiently confident indication that a valid gesture has been performed and the gesture can be recognized by a classification engine), but also for determining when to perform other operations, such as emptying a buffer of time series data when the available data indicates with sufficient confidence that a valid gesture has not been performed. Further, while the illustrative example of TABLE 1, the control logic comprises only nine rulesets, embodiments according to this disclosure are not limited thereto.

Figure 10:
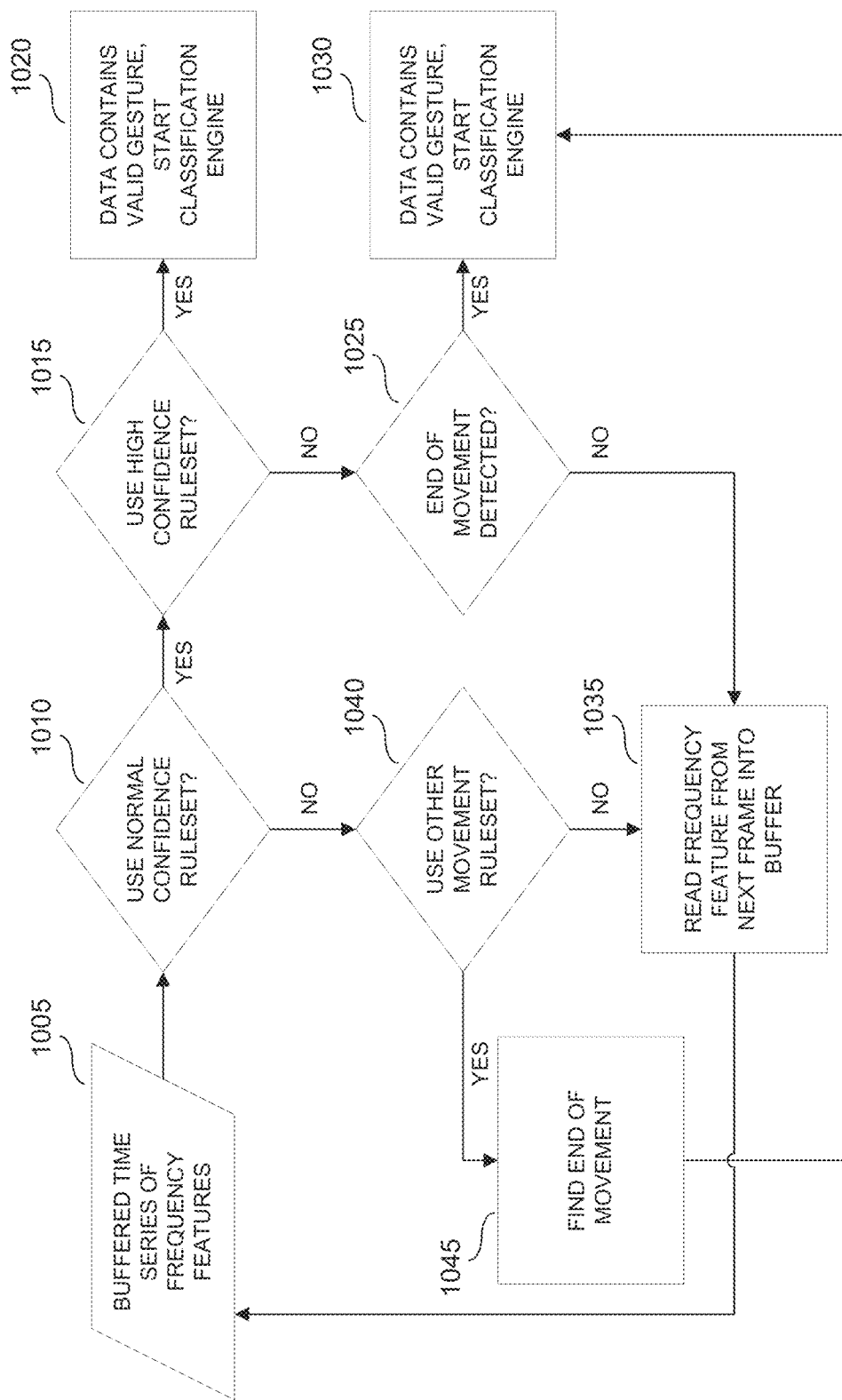
FIG. 10 illustrates an example of control logic for implementing multi-level gesture detection according to various embodiments of this disclosure.

FIG. 10 illustrates an example of control logic 1000 for implementing multi-level gesture detection according to various embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor or processing circuitry in, for example, a mobile electronic device.

Referring to the non-limiting example of FIG. 10, control logic 1000 seeks to avoid a zero-sum tradeoff between reducing latency in gesture detection and reducing accuracy in gesture detection by structuring the decision flow to depend on the confidence with which the available frequency feature data indicates that: a.) valid gesture has been performed; and b.) the gesture can be accurately identified from the available frequency feature data.

According to various embodiments control logic 1000, the electronic device or a process thereof (for example, the movement detection and segmentation stage shown at block 320 of FIG. 3A) reads a buffer 1005 containing a time series of frequency features (for example, time series of frequency features in FIG. 9) extracted from radar data. According to some embodiments, the buffer 1005 is a circular buffer. In some embodiments, the buffer 1005 is allowed to fill up and periodically cleared under predefined conditions (for example, when no movement has been detected for a specified number of consecutive radar frames).

According to various embodiments, at block 1010, control logic 1000 determines whether the time series data of buffer 1005 satisfies the conditions of one or more rulesets (for example, ruleset 2 in TABLE 1) testing whether that the contents of the buffer are likely associated with a valid gesture, and thus sufficiently "normal" (as opposed to being noise or other data) to warrant a determination of whether and when to pass the data to a classification engine or other process for fine-level gesture recognition. If, at block 1010 the contents of the buffer are determined to be "normal," control logic 1000 proceeds to block 1015.

At block 1015, control logic 1000 determines whether the time series data in buffer 1005 satisfies the conditions of one or more rulesets (for example, ruleset 4 in TABLE 1) testing whether there is a high likelihood that the time series data in buffer 1005 is not only associated with a valid gesture, but that the classification engine can accurately recognize the gesture based on the available data. If, at block 1015, the conditions of one or more of the rulesets indicating that the gesture can be accurately recognized, control logic proceeds to block 1020, where the classification engine begins analyzing at least one of the time series of frequency features in buffer 1005, or the radar data from which the frequency features were extracted, to identify a gesture.

As shown in the explanatory example of FIG. 10, if, at block 1015, the conditions of none of rulesets testing whether the time series data of buffer 1005 shows that a valid gesture can be recognized, control logic 1000 proceeds to block 1025, where a determination is performed as to whether the data in buffer 1005 shows that the end of the user's movement (for example, fourth interval 820 in FIG. 8) has been detected. If the end of the user's movement has been detected, indicating that the accuracy of the gesture recognition will likely not be improved by waiting to obtain more radar data, control logic 1000 proceeds to block 1030, the classification engine begins analyzing at least one of the time series of frequency features in buffer 1005, or the radar data from which the frequency features were extracted, to identify a gesture. If the end of the user's movement is not detected at block 1025, control logic 1000 proceeds to block 1035, wherein the frequency feature from the next frame is added to buffer 1005 and control logic 1000 starts again. While in this non-limiting example, control logic 1000 loops with every radar frame, embodiments according to this disclosure are not so limited, and frequency features from more than one radar frame may be read into buffer 1005 at block 1035.

Returning to block 1010, if the contents of buffer 1005 do not satisfy any ruleset testing whether that the contents of the buffer are likely associated with a valid gesture, control logic 1000 proceeds to block 1040, where a determination is performed as to whether the conditions of a ruleset testing whether the contents of buffer 1005 are associated with an "other movement," which can likely be recognized as a valid control gesture upon completion of the movement. If the time series of frequency features in buffer 1005 shows the conditions an "other movement" satisfied, control logic 1000 proceeds to operation 1045, wherein the electronic device waits until the end of the user's movement is detected and then performs gesture recognition on the available data. If, at block 1040, the conditions for using an "other movement" ruleset (for example, ruleset 8 in Table 1) are not satisfied, control logic 1000 proceeds to block 1035.

Figure 11:
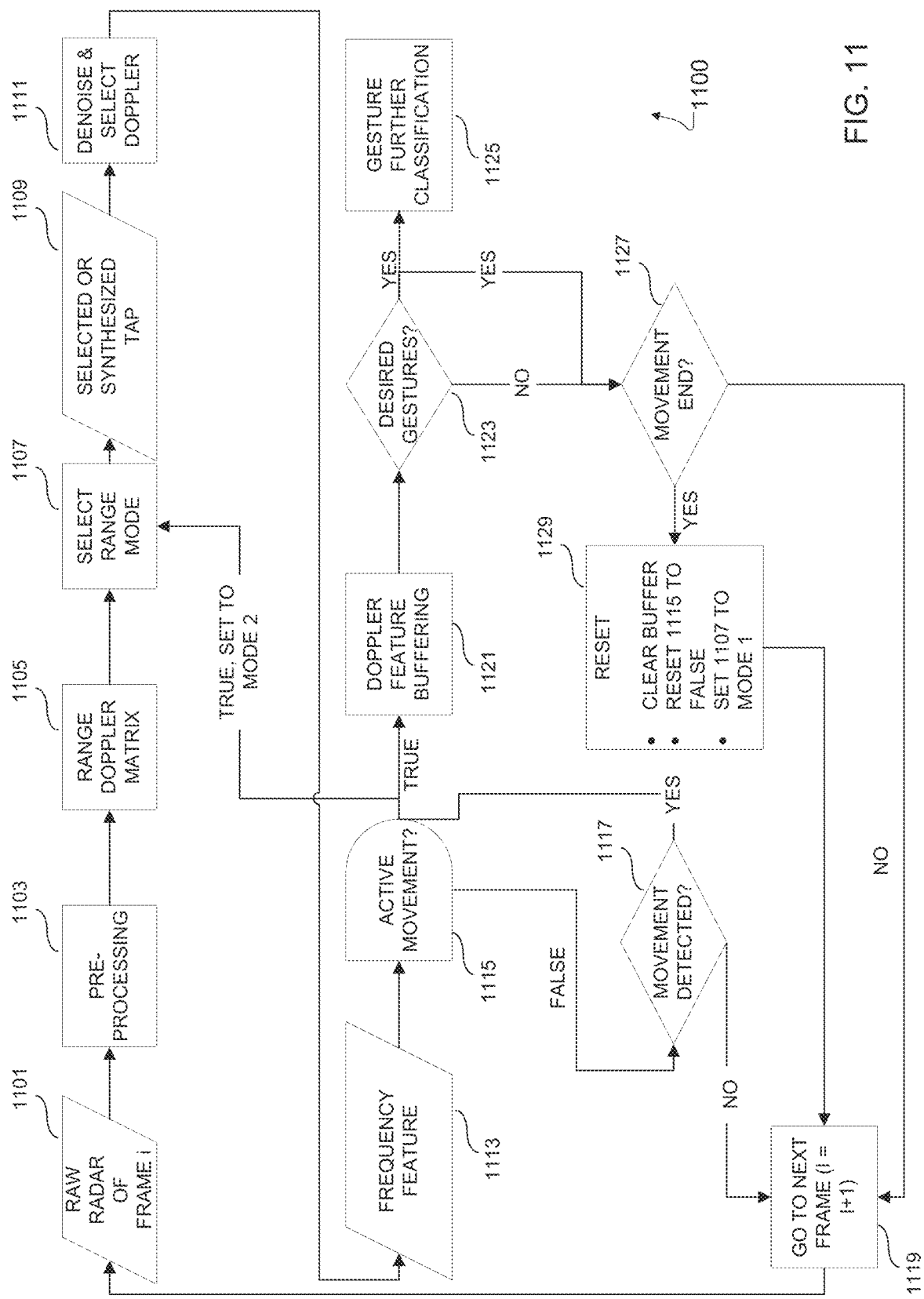
FIG. 11 illustrates an example of control logic for implementing radar-based gesture detection according to some embodiments of this disclosure.

FIG. 11 illustrates operations of a method 1100 for performing radar-based gesture recognition according to various embodiments of this disclosure.

Referring to the non-limiting example of FIG. 11, at block 1101, the electronic device collects raw measurements associated with an ith frame. According to certain embodiments, the measurements obtained at block 1101 can be expressed as a three-dimensional CIR matrix (for example, 3-D CIR matrix 460 in FIG. 4B), wherein the dimensions of measurements within the matrix comprising the tap index of a measurement, the burst index of the measurement and the pulse index of the measurement. At block 1103, the raw measurements are pre-processed, for example, by performing a Fourier transform, to obtain a range doppler matrix 1105 (for example, range doppler matrix 465 in FIG. 4B or processed radar frame 400 in FIG. 4C).

As shown in the illustrative example of FIG. 11, at block 1107, the electronic device or a process thereof (for example, activity detection and recognition module 310 in FIG. 3A) selects the mode by which it obtains data at a representative range from the electronic device. According to certain embodiments the default mode (or "mode 1") is to select data from a single tap index (as done in the "No" branch shown in FIG. 7), and the alternative mode (or "mode 2") is to select data from multiple tap indices (as done in the "Yes" branch shown in FIG. 7) if a predefined condition, such as whether motion has been recently detected, is satisfied.

In certain embodiments, at block 1109, depending on the mode selected at block 1107, either Doppler frequency data from a single selected tap or a synthesized tap is acquired. At block 1111, the tap acquired at block 1109 is denoised and filtered to separate Doppler measurements unlikely to be associated with objects of interest. According to various embodiments, the denoising and selection of relevant Doppler frequencies is performed by comparing the Doppler measurements against one or more signal to noise thresholds to exclude signals that are too weak to likely be from objects of interest, and then clustering the filtered signals to exclude signals which fail to satisfy clustering requirements.

Referring to the non-limiting example of FIG. 11, at block 1113 a single frequency feature for frame i (for example, frequency feature 521 in FIG. 5, or frequency feature 651 in FIG. 6) is acquired. According to various embodiments, the representative frequency feature is obtained based on a weighted average of the Doppler frequency data remaining after denoising and filtering at block 1109. In some embodiments, the strongest Doppler frequency value of the remaining frequency data is selected as the frequency feature.

In the explanatory example of FIG. 11, block 1115 is a gate function depending on whether active movement has previously been detected in the ROI of the electronic device. In this example, the default value of block 1115 is "false," meaning that method 1100 then proceeds to block 1117, wherein a determination is performed as to whether movement can be detected based on the frequency feature acquired at block 1113. If no movement is detected at block 1117, method 1100 proceeds to block 1119, where the analysis of frame i ends, and method 1100 is reiterated for the i+1th frame. If, however, movement is detected at block 1117, the value of block 1115 is set to "true" (which, in some embodiments, means that a different range mode is selected at block 1107), and the frequency feature acquired at block 1113 is added to a buffer of Doppler features at block 1121. According to certain embodiments, the buffer to which the frequency feature acquired at block 1113 operates as a current "recording" of frequency features which, taken together, may be associated with a valid gesture.

At block 1123, the time-series of frequency features in the buffer are analyzed to see if the series of frequency features satisfies conditions exhibiting the presence of a valid gesture. According to certain embodiments, the time series of frequency features is analyzed by applying rulesets built upon logical (for example, combinations formed using Boolean operators) combinations of features (for example, zero crossings and peaks) satisfying predetermined conditions.

Referring to the illustrative example of FIG. 11, if at block 1123, the time series of frequency features in the buffer satisfies one or more rulesets testing whether a valid gesture has been detected, method 1100 proceeds to block 1125, wherein the start of a classification engine or other computational process for affirmatively recognizing the gesture is triggered. Further, in response to triggering the start of the classification, the buffer containing the time series of frequency features is reset, and the filter at block 1115 and range mode are reset to their default values.

If, at block 1123, the time series of frequency features in the buffer does not satisfy the one or more rulesets testing whether a valid gesture has been detected, method 1100 proceeds to block 1127, where the time series of frequency features is further analyzed to determine whether the movement at the representative range has ended. If, at block 1127, it is determined that the movement has ended, method 1100 proceeds to blocks 1125 and 1129, as no further data to improve the accuracy of the gesture recognition is forthcoming, and the buffer and defaults are reset. If, however, at block 1127 it is determined that the movement represented by the time series of frequency features in the buffer is not yet complete, method 1100 proceeds to block 1119, wherein the analysis as to whether the electronic device is ready to trigger a classification engine is reiterated using the i+1th frame.

FIG. 12 illustrates operations of a method 1200 for performing radar-based gesture recognition according to various embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor or processing circuitry in, for example, a mobile electronic device.

Referring to the non-limiting example of FIG. 12, at operation 1205, one or more processors (for example, main processor 140 in FIG. 1) of an electronic device receive a radar signal from a transceiver (for example, communication unit 110 in FIG. 1). In certain embodiments, the processor performs one or more pre-processing operations (for example, operations described with reference to block 305 of FIG. 3A), such as demultiplexing and performing fast Fourier transforms to format the radar data into radar frames (for example, radar frame 400 in FIG. 4C), wherein each radar frame comprises, for a given time, a set of signal strength measurements at a plurality of Doppler frequency shift values. Further, each radar frame may include signal strength measurements taken across multiple tap indices.

According to some embodiments, at operation 1210, the processor extracts a time series of frequency features (for example, time series 523 in FIG. 5 or time series 653 in FIG. 6), wherein each frequency feature of the time series comprises a point value of a Doppler frequency shift for a given moment in time.

As shown in the illustrative example of FIG. 12, at operation 1215, the processor identifies segments within the time series of frequency features. According to certain embodiments, identifying segments comprises testing the time series of frequency features for conditions (for example, zero crossings and peaks) satisfying predefined criteria to identify temporal intervals (also referred to as segments, such as segment 825 in FIG. 8) that likely contain a valid gesture, which, with sufficient data can accurately be recognized by a classification engine.

Referring to the non-limiting example of FIG. 12, at operation 1220, one or more segments are analyzed to determine a start time for a classification engine, or other computational process for identifying a valid gesture from a time series of frequency features or radar signals from the time period associated with the segment. According to some embodiments, analyzing a segment to determine the start time for the classification engine comprises testing the time series of frequency features for combinations of conditions (for example, rulesets 1-9 in TABLE 1) indicating whether data from segment is ready to be passed to the classification engine. In certain embodiments, the analysis to determine the start time for the classification engine is a multi-level analysis (for example, control logic 1000 in FIG. 10) which analyzes the data to determine whether any accuracy gains may be obtained by delaying the start time to obtain further frequency features.

At operation 1225, at least one of the time series of frequency features or the underlying radar data obtained over an identified segment is passed to a classification engine to identify a gesture. According to some embodiments, the classification engine comprises a neural network or ML object recognition model trained to identify gestures within time series of frequency features or radar frames.

At operation 1230, a control input is triggered based on the gesture recognized at operation 1225. As one non-limiting example, upon recognition of the control gesture, a switch from one state of operation of an application (for example, first state of operation 200 in FIG. 2A) to another state of operation of the application (for example, second state of operation 210 in FIG. 2A) is triggered.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method comprising:
   receiving from a transceiver, at a processor of an electronic device, a radar signal, the radar signal comprising a set of signal strength values across a range of Doppler frequency shift values and a range of time values;
   extracting a time series of frequency features from the radar signal, wherein frequency features of the time series of frequency features comprise a determined Doppler frequency shift value for each time value of the range of time values;
   identifying segments within the time series of frequency features;
   implementing multi-confidence level gesture detection based on one or more of the identified segments or the time series of frequency features or the radar signal, to determine a start time for a classification engine;
   at the start time, analyzing, by the classification engine, at least one of a subset of the time series of frequency features or a subset of the radar signal to identify a control gesture; and
   triggering a control input associated with the control gesture.

2. The method of claim 1, wherein extracting the time series of frequency features from the radar signal comprises:
   generating a radar frame, wherein the radar frame comprises power intensity values across a plurality of frequency ranges;
   denoising the radar frame based on a comparison of the power intensity values relative to a noise threshold; and
   performing clustering to the denoised radar frame to extract frequency features of the radar frame.

3. The method of claim 2, wherein generating the radar frame further comprises:
   responsive to detecting motion, generating the radar frame based on power intensity values obtained over a plurality of adjacent tap indices; and
   responsive to detecting no motion, generating the radar frame based on power intensity values obtained at a single tap index.

4. The method of claim 1, wherein identifying segments within the time series of frequency features comprises:
   detecting at least one of a peak satisfying a peak amplitude criterion or a zero crossing satisfying a predefined amplitude criterion within the time series of frequency features.

5. The method of claim 4, further comprising:
   detecting that the zero crossing exceeds an adjustment threshold; and
   responsive to detecting the zero crossing exceeds the adjustment threshold, adjusting the predefined amplitude criterion.

6. The method of claim 4, further comprising whether the peak satisfying the peak amplitude criterion also satisfies at least one of a peak width or peak prominence criterion.

7. An apparatus, comprising:
   a processor;
   a transceiver; and
   a memory containing instructions, which when executed by the processor, cause the apparatus to:
   receive from the transceiver at the processor, a radar signal, the radar signal comprising a set of signal strength values across a range of Doppler frequency shift values and a range of time values, extract a time series of frequency features from the radar signal, wherein frequency features of the time series of frequency features comprise a determined Doppler frequency shift value for each time value of the range of time values, identify segments within the time series of frequency features, implement multi-confidence level gesture detection based on one or more of the identified segments of the time series of frequency features or the radar signal, to determine a start time for a classification engine, at the start time, analyze, by the classification engine, at least one of a subset of the time series of frequency features or a subset of the radar signal to identify a control gesture, and trigger a control input associated with the control gesture.

8. The apparatus of claim 7, further comprising instructions which, when executed by the processor, cause the apparatus to extract the time series of frequency features from the radar signal by:

generating a radar frame, wherein the radar frame comprises power intensity values across a plurality of frequency ranges, denoising the radar frame based on a comparison of the power intensity values relative to a noise threshold, and performing clustering to the denoised radar frame to extract frequency features of the radar frame.

9. The apparatus of claim 8, further comprising instructions which, when executed by the processor, cause the apparatus to generate the radar frame by:

responsive to detecting motion, generating the radar frame based on power intensity values obtained over a plurality of adjacent tap indices, and responsive to detecting no motion, generating the radar frame based on power intensity values obtained at a single tap index.

10. The apparatus of claim 7, further comprising instructions, which, when executed by the processor, cause the apparatus to identify segments within the time series of frequency features by detecting at least one of a peak satisfying a peak amplitude criterion or a zero crossing satisfying a predefined amplitude criterion within the time series of frequency features.

11. The apparatus of claim 10, further comprising instructions that, when executed by the processor, cause the apparatus to:

detect that the zero crossing exceeds an adjustment threshold, and responsive to detecting the zero crossing exceeds the adjustment threshold, adjust the predefined amplitude criterion.

12. The apparatus of claim 10, further comprising instructions which, when executed by the processor, cause the apparatus to determine whether the peak satisfying the peak amplitude criterion also satisfies at least one of a peak width or peak prominence criterion.

13. A non-transitory computer-readable medium, comprising instructions which, when executed by a processor, cause an apparatus to:

receive from a transceiver, at a processor of an electronic device, a radar signal, the radar signal comprising a set of signal strength values across a range of Doppler frequency shift values and a range of time values, extract a time series of frequency features from the radar signal, wherein frequency features of the time series of frequency features comprise a determined Doppler frequency shift value for each time value of the range of time values, identify segments within the time series of frequency features, implement multi-confidence level gesture detection based on one or more of the identified segments of the time series of frequency features or the radar signal, to determine a start time for a classification engine, at the start time, analyze, by the classification engine, at least one of a subset of the time series of frequency features or a subset of the radar signal to identify a control gesture, and trigger a control input associated with the control gesture.

14. The non-transitory computer-readable medium of claim 13, further comprising instructions which, when executed by the processor, cause the apparatus to extract the time series of frequency features from the radar signal by:

generating a radar frame, wherein the radar frame comprises power intensity values across a plurality of frequency ranges, denoising the radar frame based on a comparison of the power intensity values relative to a noise threshold, and performing clustering to the denoised radar frame to extract frequency features of the radar frame.

15. The non-transitory computer-readable medium of claim 14, further comprising instructions, which when executed by the processor, cause the apparatus to generate the radar frame by:

responsive to detecting motion, generating the radar frame based on power intensity values obtained over a plurality of adjacent tap indices, and responsive to detecting no motion, generating the radar frame based on power intensity values obtained at a single tap index.

16. The non-transitory computer-readable medium of claim 13, further comprising instructions, which, when executed by the processor, cause the apparatus to identify segments within the time series of frequency features by detecting at least one of a peak satisfying a peak amplitude criterion or a zero crossing satisfying a predefined amplitude criterion within the time series of frequency features.

17. The non-transitory computer-readable medium of claim 16, further comprising instructions, which when executed by the processor, cause the apparatus to:

detect that the zero crossing exceeds an adjustment threshold, and responsive to detecting the zero crossing exceeds the adjustment threshold, adjust the predefined amplitude criterion.

18. The non-transitory computer-readable medium of claim 16, further comprising instructions, which, when executed by the processor, cause the apparatus to determine whether the peak satisfying the peak amplitude criterion also satisfies at least one of a peak width or peak prominence criterion.

* * * * *